United States Patent
Amerige et al.

(10) Patent No.: US 10,769,827 B1
(45) Date of Patent: Sep. 8, 2020

(54) DETERMINING WHETHER TO OVERLAY TEXT INCLUDED IN A CONTENT ITEM ON AN IMAGE INCLUDED IN THE CONTENT ITEM FOR PRESENTATION TO A USER OF AN ONLINE SYSTEM

(71) Applicant: Facebook, Inc., Menlo Park, CA (US)

(72) Inventors: Brian Amerige, Menlo Park, CA (US); Thomas Reese, Palo Alto, CA (US); Christopher Joseph Welch, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 254 days.

(21) Appl. No.: 15/963,035

(22) Filed: Apr. 25, 2018

(51) Int. Cl.
| | | |
|---|---|---|
| *G06F 17/00* | (2019.01) | |
| *G06T 11/60* | (2006.01) | |
| *G06Q 50/00* | (2012.01) | |
| *G06K 9/34* | (2006.01) | |
| *G06F 40/106* | (2020.01) | |

(52) U.S. Cl.
CPC .......... *G06T 11/60* (2013.01); *G06F 40/106* (2020.01); *G06K 9/344* (2013.01); *G06Q 50/01* (2013.01)

(58) Field of Classification Search
None
See application file for complete search history.

(56) References Cited

U.S. PATENT DOCUMENTS

| | | | | |
|---|---|---|---|---|
| 5,761,344 A * | 6/1998 | Al-Hussein | ........ | G06K 9/00456 382/237 |
| 2005/0025235 A1* | 2/2005 | Hoang | ............. | G08B 13/19671 375/240.01 |
| 2007/0040849 A1* | 2/2007 | Jeffrey | ................... | G09G 5/363 345/629 |
| 2007/0046687 A1* | 3/2007 | Soroushi | .................. | G06F 3/14 345/589 |
| 2010/0061633 A1* | 3/2010 | Ma | .......................... | G06K 9/38 382/176 |
| 2014/0245115 A1* | 8/2014 | Zhang | .................. | G06F 40/103 715/202 |
| 2014/0281847 A1* | 9/2014 | Marra | ..................... | G06Q 10/10 715/202 |
| 2016/0093080 A1* | 3/2016 | Tumanov | ................. | G06T 3/40 345/589 |
| 2016/0140636 A1* | 5/2016 | Lang | ..................... | G06K 9/4638 705/26.61 |
| 2017/0032553 A1* | 2/2017 | O'Donovan | .......... | G06F 3/0484 |
| 2019/0069007 A1* | 2/2019 | Bodas | .................... | H04N 19/44 |
| 2019/0156459 A1* | 5/2019 | Chen | ..................... | G06T 3/4053 |

* cited by examiner

*Primary Examiner* — Mustafa A Amin
(74) *Attorney, Agent, or Firm* — Fenwick & West LLP

(57) ABSTRACT

An online system presents a user with a content item including an image and text. The online system overlays the text on the image if it predicts doing so will not render the text unreadable. To predict whether the overlay will render the text unreadable, the online system computes values describing various visual characteristics of a segment of the image on which the text may be overlaid and compares the values to corresponding threshold values. Based on the comparison, the online system predicts a readability of the text if overlaid on the segment. If the predicted readability is at least a threshold readability, the online system overlays the text on the segment of the image and presents the content item to the user with the text overlaid on the image. Otherwise, the online system presents the content item to the user with the text not overlaid on the image.

16 Claims, 8 Drawing Sheets

DETERMINING WHETHER TO OVERLAY TEXT INCLUDED IN A CONTENT ITEM ON AN IMAGE INCLUDED IN THE CONTENT ITEM FOR PRESENTATION TO A USER OF AN ONLINE SYSTEM

BACKGROUND

This disclosure relates generally to online systems, and more specifically to presentation of content including images and text to users of an online system.

Online systems, such as social networking systems, allow online system users to connect to and to communicate with other online system users. Users may create profiles on an online system that are tied to their identities and include information about the users, such as interests and demographic information. The users may be individuals or entities such as corporations or charities. Online systems allow users to easily communicate with other users and to share content with other users by providing content items to an online system for presentation to the other users. Content items provided to an online system by a user may include declarative information about the user, status updates, check-ins to locations, images, photographs, videos, text, and/or any other information the user wishes to share with additional users of the online system. An online system may also generate content items for presentation to a user, such as content items describing actions taken by other users on the online system.

Online systems commonly present their users with feeds of content that include multiple content items selected for presentation to a user by an online system. For example, a feed of content presented to a user includes a display area in which one or more content items selected for presentation to the user are displayed at a single time and in which additional content items selected for presentation to the user are displayed if the user interacts with the feed of content. Each content item selected for presentation to a user in a feed of content may include multiple content item components, such as images and text associated with the images. For example, a user may upload a photo to the online system along with text that provides a caption for the photo if the user wishes to share the photo and caption with additional online system users; both the photo and text may be subsequently selected by the online system for simultaneous presentation in a content item included in a feed of content provided to an additional user.

Multiple components of content items simultaneously presented as a content item in a feed of content may be displayed in various configurations. For example, a content item including an image and text may be displayed in a feed of content presented to a user in a configuration in which the image and text are adjacent to each other. As users of online systems more frequently access content via mobile devices or other devices with a limited display area, however, online systems may display various components of content items in configurations that reduce the size of the display area in which a content item is presented in a feed of content. For example, if the online system selects a content item including an image and text describing the image for presentation to a user in a feed of content, the text may be overlaid on the image when presented in the feed of content rather than being displayed adjacent to the image. This allows an online system to present multiple content items to a user in a manner that increases the number of content items capable of presentation to the user via mobile devices or other devices having a limited display area.

However, while conventional methods for overlaying text on an image allow online systems to reduce the size of the display area in which a content item including text and an image is presented, certain visual characteristics of an image may render text difficult or even impossible to read if overlaid on the image. For example, images having certain magnitudes of brightness may provide too much or not enough background illumination for text to be easily readable if overlaid on the image (e.g., the text appears too faded or washed out against the image to be easily read). As another example, images having highly contrasting colors may be too visually distracting to allow text to be easily read if overlaid on the image. Additionally, text overlaid on an image may obscure and/or be obscured by certain details in the image, such as faces or other text included in the image. As a result, conventional methods for overlaying text onto images included in content items often lead to user frustration and a subsequent decline in user engagement with the online system. Thus, there is a need for improvements to methods for presenting online system users with content items including images and text.

SUMMARY

An online system identifies an opportunity to present content to a user of the online system and provides the user with a feed of content items including images and text associated with the images for presentation to the user. For example, the online system identifies an opportunity to present content to a user upon receiving a request from the user to access a newsfeed associated with the user's account on the online system and selects content items generated by the online system for presentation to the user based on a predicted affinity of the user for each of the selected content items. The online system of the preceding example generates a newsfeed comprising a user interface including the selected content items and communicates the newsfeed to a client device associated with the user for presentation. In various embodiments, the content items are sponsored content items for which the online system receives compensation in exchange for presenting to a user, while in other embodiments, the content items are organic content items for which the online system does not receive compensation in exchange for presenting to the user. For example, the online system provides a user with a feed of content including both sponsored content items and organic content items selected by the online system and/or the user for presentation to the user in a user profile page associated with the user's account on the online system. In various embodiments, the content items selected for presentation to the user include images maintained by the online system and text associated with the images. For example, text associated with an image may include a description of a subject of the image, an offer associated with a product or service depicted by the image, etc. Hence, the feed of content items provided to the user may include a variety of sponsored and/or organic content items comprising various images and items of text associated with the images.

To conserve an amount of space occupied in the feed of content by each content item including an image and text, the online system overlays text associated with an image on a segment of the image if the online system predicts the overlay will not render the text unreadable. In various embodiments, the online system identifies a segment of the image on which the text may be overlaid by identifying a region of pixels forming a portion of the image large enough to accommodate the text in a font having at least a minimum character size to be readable by a user presented with the content item. For example, the online system identifies a segment of the image including multiple columns and/or rows of pixels along a dimension of the image to accommodate one or more rows of text in a font having a character size of at least 10 points as presented in a display area of a client device. Various visual characteristics of the segment are identified by the online system and analyzed to determine whether the characteristics will potentially render the text unreadable if the text is overlaid on the segment. For example, the online system predicts text overlaid on a segment of an image will be unreadable to a user if the segment has a magnitude of brightness that is above or below certain threshold magnitudes of brightness or has above a threshold amount of colors. In the previous example, a segment having a magnitude of brightness that is above or below the threshold magnitudes of brightness is determined to have a brightness that is neither dark enough nor bright enough to allow text of contrasting brightness to be easily read if overlaid on the segment, while a segment having above the threshold amount of colors is determined to be too colorful and therefore too visually distracting to allow text to be easily read if overlaid on the segment. As an additional example, the online system predicts text overlaid on a segment of an image including at least a threshold portion of a face will be unreadable to a user presented with the content item because the segment will be too visually distracting to allow text to be easily read if overlaid onto the portion of the face included in the segment.

To predict whether various visual characteristics of the segment will potentially render the text unreadable if the text is overlaid on the segment, the online system computes one or more values describing each of the various visual characteristics of the segment identified by the online system and compares the computed values to one or more corresponding threshold values. In various embodiments, at least one of the one or more computed values includes a measure of a magnitude of brightness of a specified amount of pixels forming the segment of the image on which the text may be overlaid. For example, the online system identifies a distribution of magnitudes of brightness among pixels forming the segment of the image and computes a brightness value describing an average magnitude of brightness shared by at least a threshold number or percentage of the pixels. In some embodiments, the online system computes the brightness value by generating a histogram describing the distribution of brightness from pure black to pure white among pixels of the segment, assigning a pixel value to each magnitude of brightness described by the histogram, and computing a mean of the assigned values among a threshold portion of the pixels. In the preceding example, the brightness value computed by the online system is the mean of the pixel values assigned to each pixel of a threshold number of pixels in the segment.

In some embodiments, at least one of the one or more values computed by the online system to describe a visual characteristic of the segment includes a measure of colorfulness of a specified amount of pixels forming the segment. For example, the online system identifies a distribution of colors among pixels forming the segment and computes a color value describing the distribution of colors among at least a threshold number or percentage of the pixels. The color value may be a number of colors included in at least a threshold portion of pixels comprising the segment, a ratio of the number of colors to a number of pixels comprising at least the threshold portion of the segment, or any other suitable measure of colorfulness of the segment. In such embodiments, the online system may quantize colors of the image or segment of the image to generate a quantized set of colors on which the color value is based. Additionally, or alternatively, the online system may compute a color value describing a colorfulness of the segment based on differences of color ("color shifts") among sequentially adjacent pixels forming the segment, in some embodiments. For example, rather than quantizing the colors of the image, the online system detects threshold differences of color between adjacent pixels in each column and/or row of pixels forming the segment and computes a color value describing the number of detected differences. In yet other embodiments, at least one value of the one or more values computed by the online system to describe a visual characteristic of the segment describes a portion of the segment representing at least a threshold portion of a face or other graphic detail. For example, using a face detection algorithm, the online system detects the image includes a human face and computes a value describing a number of pixels of the segment comprising an area of the face including at least a portion of an eye, a nose and a mouth.

The online system compares the computed value(s) describing the visual characteristic(s) of the segment to one or more threshold values and predicts a readability of the text if overlaid on the segment when presented to the user based on the comparison. The predicted readability of the text describes a predicted likelihood the text would be readable by a user if the text is overlaid on the segment when presented. In various embodiments, the online system predicts there is at least a threshold readability of the text if overlaid on the segment if one or more of the computed values are at least a corresponding threshold value. For example, if a brightness value describing a magnitude of brightness of at least a threshold portion of the segment is above a threshold magnitude of brightness (e.g., is very bright), the online system predicts the text may be overlaid on the segment without loss of readability (e.g., in a dark font). In such embodiments, a value that is below the threshold value indicates a characteristic of the segment described by the value would cause the text to be unreadable by a user presented with the content item if the text is overlaid on the segment.

In some embodiments, the online system also predicts there is at least a threshold readability of the text if overlaid on the segment if one or more of the computed values are below a threshold value. For example, if a brightness value describing a magnitude of brightness of at least a threshold portion of the segment is below a threshold magnitude of brightness (e.g., the segment is very dark), the online system predicts text may be overlaid on the segment without loss of readability (e.g., in a bright font). In such embodiments, a value that is at least the threshold value indicates a visual characteristic of the segment described by the value would cause the text to be unreadable by a user if overlaid on the segment when presented.

In embodiments in which more than one value describing a visual characteristic of the segment is computed and compared to a corresponding threshold value, the predicted readability of the text if overlaid on the segment may be expressed as a readability score that is based on each comparison. The readability score is then compared to a threshold readability score to predict whether there is at least a threshold readability of the text if overlaid on the segment. In such embodiments, the online system predicts there is at least a threshold readability of the text if overlaid on the segment if the computed readability score is at least the threshold readability score. For example, the online system computes a readability score corresponding to an average normalized difference between the computed values describing the various visual characteristics of the segment and their corresponding threshold values, and compares the computed readability score to a threshold readability score. If the readability score is less than the threshold readability score, the online system predicts there is less than the threshold readability of the text if overlaid on the segment, indicating one or more visual characteristics of the segment would likely render the text unreadable to the user if overlaid on the segment when presented. However, if the readability score is at least the threshold readability score, the online system predicts there is at least a threshold readability of the text if overlaid on the segment, indicating the text is likely readable by the user if overlaid on the segment when presented. In various embodiments, the predicted readability of the text if overlaid on the segment may be determined using a machine learned model.

If the online system predicts the readability of the text is at least a threshold readability, the online system selects one or more characteristics of a font for the text based at least in part on the comparison of the value(s) to the threshold value(s). In various embodiments, the characteristic(s) of the font selected by the online system include a magnitude of brightness of the font and/or a color of the font. Additional characteristics of the font that may be selected by the online system include a type of the font, a size of the font, a character spacing of the font, and/or a weight of the font, in some embodiments. In various embodiments, if the online system predicts the readability of the text is at least the threshold readability based on a determination that a computed brightness value is at least a threshold brightness value (e.g., the segment is very bright) or below a threshold brightness value (e.g., the segment is very dark), the online system selects a magnitude of brightness for the font that contrasts with the magnitude of brightness described by the brightness value. In other embodiments, if the online system predicts the readability of the text is at least the threshold readability based on a determination that a computed color value and/or face value is less than a threshold value (e.g., the segment is monochromatic), the online system selects a color and/or magnitude of brightness for the font that contrasts with one or more visual characteristics of the segment.

In various embodiments, the online system may also determine whether to apply a gradient to the segment based on the comparison of the computed value(s) describing the visual characteristic(s) of the segment and corresponding threshold value(s). In some embodiments, a gradient applied to the segment modifies an opacity of a set of pixels forming the segment such that one dimension of the segment has an opacity that is either greater than or less than the opacity of an opposite dimension of the segment. For example, applying the gradient to the segment decreases a magnitude of opacity of each row of multiple rows of pixels forming the segment by a specified factor relative to a magnitude of opacity of an adjacent row of pixels such that the opacity of the portion of the image comprising the segment gradually decreases from an inner dimension of the segment to an outer dimension of the segment. Applying a gradient to the segment allows the online system to increase or reduce a magnitude of opacity of the segment to allow greater readability of the text if overlaid on the segment, in some embodiments. For example, the online system applies a gradient to the segment if a computed brightness value describing a magnitude of brightness of at least a threshold number of pixels forming the segment is less than the threshold brightness value but greater than an additional threshold brightness value (e.g., the segment is somewhat bright) to increase the magnitude of brightness of the segment, allowing greater readability of contrasting text (e.g., black text) overlaid on the segment. Similarly, the online system applies a gradient to the segment if the computed brightness value is greater than a threshold brightness value but less than an additional threshold brightness value (e.g., the segment is somewhat dark) to decrease the magnitude of brightness of the segment to allow greater readability of contrasting text (e.g., white text) overlaid on the segment.

In various embodiments, the online system generates a user interface including the content item for presentation to the user and sends the user interface to a client device associated with the user for presentation to the user. For example, the user interface is a feed of content presenting multiple content items to the user via a display area of a client device associated with the user. If the online system predicts the readability of the text is at least the threshold readability if overlaid on the segment of the image, the online system overlays the text on the segment in a font having the one or more characteristics selected by the online system. For example, if the online system predicts the readability of the text is at least the threshold readability if overlaid on the segment based on a brightness value that is at least a threshold brightness value (e.g., the segment has a very high magnitude of brightness), the online system selects a font having a very low magnitude of brightness for the text and overlays the text on the segment for presentation to the user via the user interface. However, if the online system does not predict the readability of the text is at least the threshold readability if overlaid on the segment, the online system does not overlay the text on the segment, in some embodiments. For example, if the online system computes a readability score that is less than a threshold readability score, the online system determines one or more visual characteristics of the segment are predicted to render the text unreadable if overlaid on the segment and generates a user interface including the content item in a configuration in which the text is adjacent to, but not overlaying, the image for presentation to the user.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
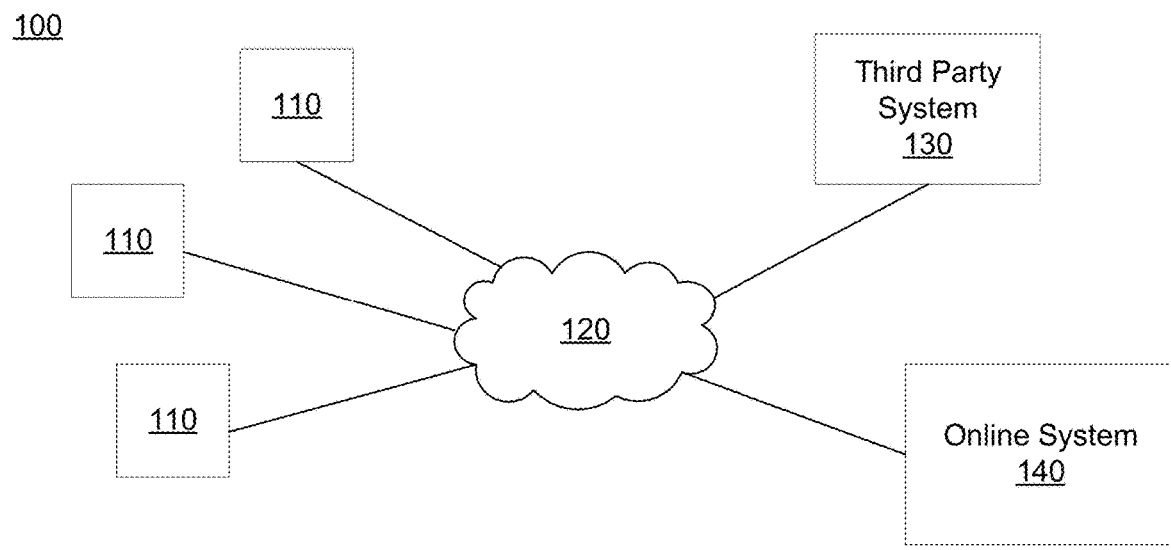
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. The embodiments described herein can be adapted to social networking systems that are content sharing networks or other online systems 140 providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, a smartwatch or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device 110. In other embodiments, a third party system 130 provides content or other information for presentation via a client device 110. A third party system 130 may also communicate information to the online system 140, such as advertisements, content, or information about an application provided by the third party system 130.

In some embodiments, one or more of the third party systems 130 provide content to the online system 140 for presentation to users of the online system 140 and provide compensation to the online system 140 in exchange for presenting the content. For example, a third party system 130 provides advertisement requests, which are further described below in conjunction with FIG. 2, including advertisements for presentation and amounts of compensation provided by the third party system 130 for presenting the advertisements to the online system 140. Other types of sponsored content may be provided by a third party system 130 to the online system 140 for presentation by the online system 140 in exchange for compensation from the third party system 130. Sponsored content from a third party system 130 may be associated with the third party system 130 or with an entity on whose behalf the third party system 130 operates.

In some embodiments, one or more of the third party systems 130 is a trusted third party system 130 that provides data analysis services to the online 140. For example, a third party system 130 is an entity, such as a data analytics provider, that receives information describing actions performed by users of the online system 140 from the online system 140 or one or more entities external to the online system 140. In various embodiments, the third party system 130 receives information describing actions associated with electronic content presented to various audiences by various content publishers and identifies individuals who performed the actions. In some embodiments, the third party system 130 compiles information describing the actions and the individuals who performed them, and provides the information to the online system 140 as a performance metric or as raw data, which the online system 140 utilizes for generation of a performance metric, as described in more detail in conjunction with FIG. 3 below.

Figure 2:
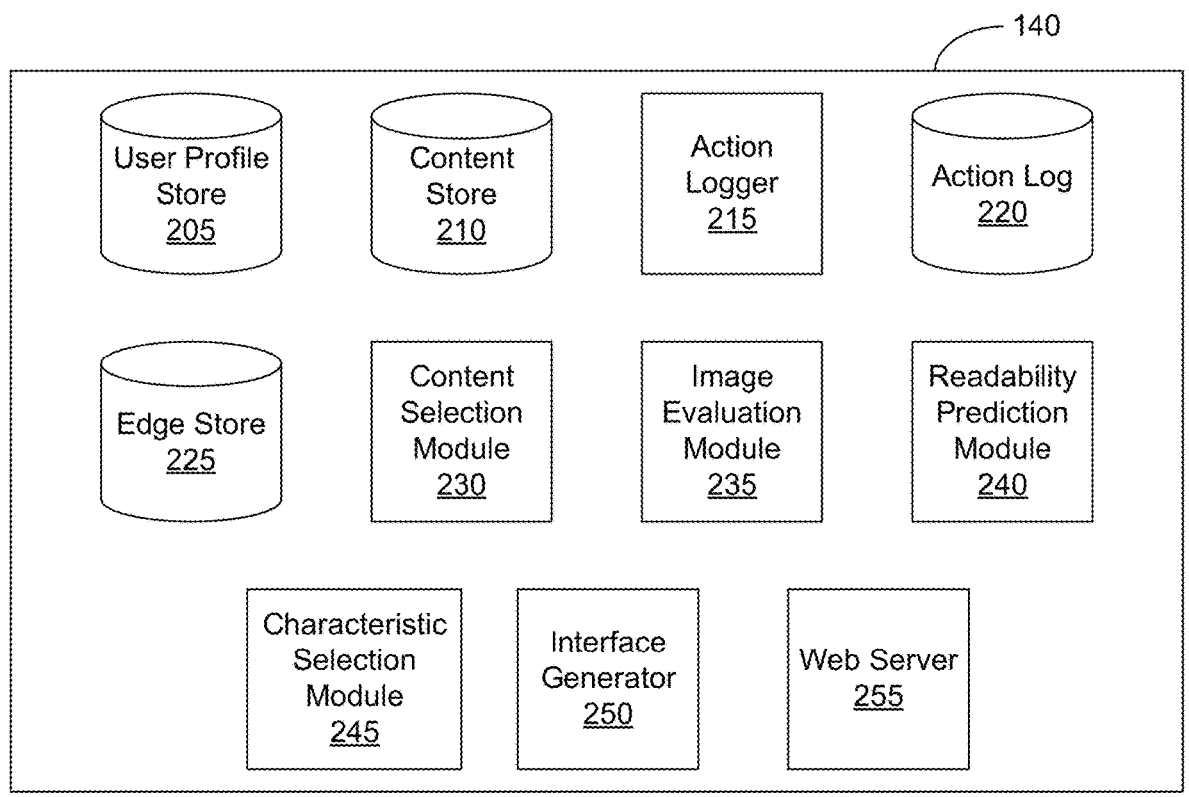
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a content selection module 230, an image evaluation module 235, a readability prediction module 240, a characteristic selection module 245, an interface generator 250, and a web server 255. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity. In some embodiments, the brand page associated with the entity's user profile may retrieve information from one or more user profiles associated with users who have interacted with the brand page or with other content associated with the entity, allowing the brand page to include information personalized to a user when presented to the user.

The content store 210 stores objects that each represents various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

One or more content items included in the content store 210 include content for presentation to a user and a bid amount. The content is text, image, audio, video, or any other suitable data presented to a user. In various embodiments, the content also specifies a page of content. For example, a content item includes a landing page specifying a network address of a page of content to which a user is directed when the content item is accessed. The bid amount is included in a content item by a publishing user who provided the content item to the online system 140 and is used to determine an expected value, such as monetary compensation, provided by the publishing user to the online system 140 if content in the content item is presented to an additional user, if the content in the content item receives a user interaction when presented, or if any suitable condition is satisfied when content in the content item is presented to an additional user. For example, the bid amount included in a content item specifies a monetary amount that the online system 140 receives from a publishing user who provided the content item to the online system 140 if content in the content item is displayed. In some embodiments, the expected value to the online system 140 of presenting the content from the content item may be determined by multiplying the bid amount by a probability of the content of the content item being accessed by a user.

Various content items may include an objective identifying an interaction that a publishing user associated with a content item desires other users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the online system 140 logs interactions between users presented with the content item or with objects associated with the content item. Additionally, the online system 140 receives compensation from a user associated with content item as online system users perform interactions with a content item that satisfy the objective included in the content item.

Additionally, a content item may include one or more targeting criteria specified by the publishing user who provided the content item to the online system 140. Targeting criteria included in a content item request specify one or more characteristics of users eligible to be presented with the content item. For example, targeting criteria are used to identify users having user profile information, connections, or actions satisfying at least one of the targeting criteria. Hence, targeting criteria allow a user to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows users to further refine users eligible to be presented with content items. As another example, targeting criteria identifies users having a connection to another user or object or having a particular type of connection to another user or object.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

In some embodiments, the action logger 215 receives communications about user actions with content presented to a user and populates the action log 220 with information about the actions. Examples of interactions with content include viewing content items, requesting additional content items for presentation, indicating a preference for a content item, sharing a content item with another user, or performing any other suitable action. A user may interact with content items by providing inputs to a client device 110 presenting content from the online system 140. The client device 110 identifies actions corresponding to various provided inputs and communicates information describing the identified actions to the action logger 215, which stores the information describing the identified actions in the action log 220.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features that each represent characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or a particular user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The content selection module 230 selects one or more content items for communication to a client device 110 to be presented to a user. Content items eligible for presentation to the user are retrieved from the content store 210 or from another source by the content selection module 230, which selects one or more of the content items for presentation to the user. A content item eligible for presentation to the user is a content item associated with at least a threshold number of targeting criteria satisfied by characteristics of the user or is a content item that is not associated with targeting criteria. In various embodiments, the content selection module 230 includes content items eligible for presentation to the user in one or more selection processes, which identify a set of content items for presentation to the user. For example, the content selection module 230 determines measures of relevance of various content items to the user based on characteristics associated with the user by the online system 140 and based on the user's affinity for different content items. Information associated with the user included in the user profile store 205, in the action log 220, and in the edge store 225 may be used to determine the measures of relevance. Based on the measures of relevance, the content selection module 230 selects content items for presentation to the user. As an additional example, the content selection module 230 selects content items having the highest measures of relevance or having at least a threshold measure of relevance for presentation to the user. Alternatively, the content selection module 230 ranks content items based on their associated measures of relevance and selects content items having a highest positions in the ranking or having at least a threshold position in the ranking for presentation to the user.

Content items eligible for presentation to the user may include content items associated with bid amounts. The content selection module 230 uses the bid amounts associated with ad requests when selecting content for presentation to the user. In various embodiments, the content selection module 230 determines an expected value associated with various content items based on their bid amounts and selects content items associated with a maximum expected value or associated with at least a threshold expected value for presentation. An expected value associated with a content item represents an expected amount of compensation to the online system 140 for presenting the content item. For example, the expected value associated with a content item is a product of the bid amount associated with the content item and a likelihood of the user interacting with the content item. The content selection module 230 may rank content items based on their associated bid amounts and select content items having at least a threshold position in the ranking for presentation to the user. In some embodiments, the content selection module 230 ranks both content items not associated with bid amounts and content items associated with bid amounts in a unified ranking based on bid amounts and measures of relevance associated with content items. Based on the unified ranking, the content selection module 230 selects content for presentation to the user. Selecting content items associated with bid amounts and content items not associated with bid amounts through a unified ranking is further described in U.S. patent application Ser. No. 13/545,266, filed on Jul. 10, 2012, which is hereby incorporated by reference in its entirety.

For example, the content selection module 230 receives a request to present a feed of content (also referred to as a "content feed") to a user of the online system 140. The feed may include one or more content items associated with bid amounts (i.e., "sponsored content items") as well as organic content items, such as stories describing actions associated with other online system users connected to the user. The content selection module 230 accesses one or more of the user profile store 205, the content store 210, the action log 220, and the edge store 225 to retrieve information about the user. For example, information describing actions associated with other users connected to the user or other data associated with users connected to the user are retrieved. Content items from the content store 210 are retrieved and analyzed by the content selection module 230 to identify candidate content items eligible for presentation to the user. For example, content items associated with users who not connected to the user or stories associated with users for whom the user has less than a threshold affinity are discarded as candidate content items. Based on various criteria, the content selection module 230 selects one or more of the content items identified as candidate content items for presentation to the identified user. The selected content items are included in a feed of content that is presented to the user. For example, the feed of content includes at least a threshold number of content items describing actions associated with users connected to the user via the online system 140.

In various embodiments, the content selection module 230 presents content to a user through a feed including a plurality of content items selected for presentation to the user. One or more content items associated with bid amounts may be included in the feed. The content selection module 230 may also determine an order in which selected content items are presented via the feed. For example, the content selection module 230 orders content items in the feed based on likelihoods of the user interacting with various content items.

In various embodiments, the image evaluation module 235 identifies a segment of an image included in a content item on which text associated with the image may be overlaid. For example, the image is a photograph or other type of graphic information uploaded to the online system 140 by an online system user or generated and maintained by the online system 140 for presentation to online system users. The text may be text provided to the online system 140 by an online system user or generated by the online system 140 for inclusion in a content item presented by the online system 140, in various embodiments. In one embodiment, the image evaluation module 235 identifies a segment of an image on which text may be overlaid by identifying a region of pixels forming a portion of the image large enough to accommodate the text in a font having at least a minimum character size to be readable by a user presented with a content item including the image and text. For example, the image evaluation module 235 identifies a segment of an image including multiple columns and/or rows of pixels along a dimension of the image to accommodate one or more rows of text in a font having a character size of at least 8 points as presented in a display area of a client device 110.

The image evaluation module 235 also identifies various visual characteristics of the identified segment and analyzes the characteristics to allow the online system 140 to predict whether the characteristics will potentially render text overlaid on the segment unreadable. For example, if the image evaluation module 235 identifies a segment of an image having a magnitude of brightness that is above or below certain threshold magnitudes of brightness, or identifies an amount of colors included in the segment that is above a threshold amount of colors, the online system 140 predicts text overlaid on the segment will be unreadable to a user presented with a content item including the text overlaid on the segment. As an additional example, the online system 140 predicts text overlaid on a segment of an image including a portion of a face will be unreadable to a user if the image evaluation module 235 determines there is at least a threshold portion of the face included in the segment.

To allow the online system 140 to predict whether various visual characteristics of an identified segment of an image will potentially render text unreadable if the text is overlaid on the segment, the image evaluation module 235 computes one or more values describing each of various visual characteristics of the segment, which are then compared to one or more corresponding threshold values. In various embodiments, at least one of the one or more computed values includes a brightness value, which is a measure of a magnitude of brightness of a specified amount of pixels forming a segment of an image on which text may be overlaid. For example, the image evaluation module 235 identifies a distribution of magnitudes of brightness among pixels forming a segment of an image on which text may be overlaid and computes a brightness value describing an average magnitude of brightness shared by at least a threshold number or percentage of the pixels.

In some embodiments, the image evaluation module 235 computes the brightness value by generating a histogram describing a distribution of brightness from pure black to pure white among pixels of the segment, assigning a pixel value to each magnitude of brightness described by the histogram, and computing a mean of the assigned values among a threshold portion of the pixels. For example, the image evaluation module 235 assigns a pixel value of between 0 and 255 to each pixel based on a magnitude of brightness of the pixel such that pixels having a brightness that is pure black are assigned a pixel value of 0, pixels having a brightness that is pure white are assigned a pixel value of 255, and pixels having a brightness that is greater than pure black and less than pure white are assigned a pixel value in a range of 0-255 that is proportional to the magnitude of brightness of the pixel. In the preceding example, the brightness value computed by the image evaluation module 235 is a mean of the pixel values assigned to each pixel of a threshold number of pixels in the segment.

In some embodiments, the image evaluation module 235 computes a color value, which is a measure of colorfulness of a specified amount of pixels forming a segment of an image on which text may be overlaid. For example, the image evaluation module 235 identifies a distribution of colors among pixels forming a segment of an image on which text may be overlaid and computes a color value describing the distribution of colors among at least a threshold number or percentage of the pixels. The color value may correspond to a number of colors included in at least a threshold portion of pixels comprising the segment, a ratio of the number of colors to a number of pixels comprising at least the threshold portion of the segment, or any other suitable measure of colorfulness of the segment, in some embodiments.

In some such embodiments, the image evaluation module 235 may quantize colors of the segment to generate a quantized set of colors on which the color value is based. For example, if the image evaluation module 235 detects there are 256 colors included in a segment of an image on which text may be overlaid, the image evaluation module 235 utilizes a color quantization algorithm to reduce the number of colors to a set of 64 colors and computes a color value describing a distribution of the 64 colors among pixels forming the segment. Additionally, or alternatively, the image evaluation module 235 may compute a color value describing a colorfulness of the segment based on differences of color ("color shifts") among sequentially adjacent pixels forming the segment, in some embodiments. For example, rather than quantizing colors of an identified segment, the image evaluation module 235 detects threshold differences of color between adjacent pixels in each column and/or row of pixels forming the segment and computes a color value describing the number of detected differences.

In yet other embodiments, the image evaluation module 235 computes a value describing a portion of a segment of an image on which text may be overlaid representing at least a threshold portion of a face or other graphic detail. For example, using a face detection algorithm, the image evaluation module 235 determines an identified segment of an image includes a portion of a human face and computes a value describing a number or percentage of pixels of the segment comprising an area of the face including at least a portion of an eye, a nose and a mouth. As further described in more detail below, the one or more values computed by the image evaluation module 235 are compared to one or more corresponding threshold values (e.g., by the readability prediction module 240) in a process that allows the online system 140 to predict whether various visual characteristics of a segment of an image will render text overlaid on the segment unreadable to a user presented with a content item including the overlaid text.

The readability prediction module 240 predicts whether various visual characteristics of a segment of an image on which text may be overlaid will potentially render the text unreadable to a user presented with a content item including the text and image if the text is overlaid on the segment when presented to the user. In various embodiments, the readability prediction module 240 compares one or more threshold values to one or more values computed by the image evaluation module 235 describing various visual characteristics of a segment of an image on which text may be overlaid and predicts a readability of the text if overlaid on the segment based on the comparison. A predicted readability of text describes a likelihood the text would be readable by a user presented with a content item including the text if the text is overlaid on a segment of an image when presented to the user.

In various embodiments, the readability prediction module 240 predicts there is at least a threshold readability of text overlaid on a segment of an image if one or more values computed by the image evaluation module 235 describing one or more visual characteristics of the segment are at least a threshold value. For example, if a brightness value describing a magnitude of brightness of at least a threshold portion of the segment is above a threshold magnitude of brightness (e.g., is very bright), the readability prediction module 240 predicts the text may be overlaid on the segment without loss of readability (e.g., in a dark font). In some such embodiments, a value that is below the threshold value indicates a characteristic of the segment described by the value would cause text overlaid on the segment to be unreadable by a user presented with a content item including the overlaid text. For example, the image evaluation module 235 computes a brightness value of 255 indicating an average magnitude of brightness among at least 95% of the pixels forming a segment of an image is pure white and the readability prediction module 240 compares the brightness value to a threshold brightness value of 245. In the preceding example, the threshold brightness value of 245 describes a minimum magnitude of brightness on which text may be overlaid without loss of readability; overlaying text on a segment having a lower magnitude of brightness renders the text unreadable (e.g., black text becomes washed out on a dark gray background). In this example, the threshold brightness value of 245 describing the minimum magnitude of brightness on which text may be overlaid without loss of readability may be determined based on historical data describing instances in which text was overlaid onto segments of images without loss of readability (e.g., using a machine learned model). Since the brightness value of 255 in the previous example is at least the threshold value of 245, the readability prediction module 240 predicts the readability of the text if overlaid on the segment is at least the threshold readability. Thus, since the segment of the previous example is above the threshold level of brightness (e.g., the segment is white), the readability prediction module 240 predicts text may be overlaid on the segment without loss of readability (e.g., in a black font).

In some embodiments, the readability prediction module 240 also predicts there is at least a threshold readability of text if overlaid on a segment of an image if one or more values computed by the image evaluation module 235 describing one or more visual characteristics of the segment are below a threshold value. For example, the readability prediction module 240 predicts text may be overlaid on a segment of an image without loss of readability if a brightness value describing a magnitude of brightness of at least a threshold portion of the segment is below a threshold magnitude of brightness (e.g., the segment is very dark, allowing text overlaid on the segment to be easily readable if overlaid in a very bright font). As another example, the readability prediction module 240 predicts text may be overlaid on a segment of an image without loss of readability if a color value describing a distribution of colors among at least a threshold portion of the segment is below a threshold color value (e.g., the segment is monochromatic, allowing text overlaid on the segment to be easily readable if overlaid in a contrasting font).

In some embodiments, the readability prediction module 240 predicts text overlaid on a segment of an image will be unreadable to a user presented with a content item including the overlaid text if a value describing a visual characteristic of the segment is at least a threshold value. For example, the image evaluation module 235 computes a brightness value of 0 indicating an average magnitude of brightness among at least 90% of pixels forming a segment of an image is pure black and the readability prediction module 240 compares the brightness value to a threshold brightness value of 30. In this example, the threshold brightness value of 30 describes a maximum magnitude of brightness against which text may be overlaid without loss of readability; overlaying text on a segment having a higher magnitude of brightness renders the text unreadable (e.g., white text becomes washed out on a light gray background). In this example, the threshold brightness value of 30 describing the maximum magnitude of brightness against which text may be overlaid without loss of readability may be determined based on historical data describing instances in which text was overlaid onto segments of images without loss of readability (e.g., using a machine learned model). Since the brightness value of 0 in the preceding example is less than the threshold value of 30, the readability prediction module 240 predicts the readability of the text if overlaid on the segment is at least a threshold readability. Thus, the readability prediction module 240 predicts that since the segment of the previous example is below a threshold level of brightness (e.g., the segment is black), text may be overlaid on the segment without loss of readability (e.g., in a white font).

As yet another example, the image evaluation module 235 computes a color value of 15 indicating there are 15 threshold differences of color between adjacent pixels forming at least 80% of a segment of an image and the readability prediction module 240 compares the color value to a threshold color value of 10. In this example, the readability prediction module 240 predicts the readability of the text if overlaid on the segment is less than the threshold readability since the color value of 15 is greater than the threshold value of 10. In the previous example, since the color value of the segment of the previous example is at least the threshold color value, the readability prediction module 240 predicts the segment is too colorful and therefore too visually distracting to allow text to be read if overlaid on the segment when presented to a user. In embodiments in which the image evaluation module 235 computes a value describing a portion of a face or other graphic detail included in a segment of an image, the readability prediction module 240 compares the value to a threshold value and predicts a readability of text if overlaid on the segment based on the comparison.

In embodiments in which the image evaluation module 235 computes more than one value describing a visual characteristic of a segment of an image on which text may be overlaid, the readability prediction module 240 may compute a readability score describing a predicted readability of the text if overlaid on the segment based on a comparison of each computed value to a corresponding threshold value. The readability prediction module 240 compares the readability score to a threshold readability score to predict whether there is at least a threshold readability of the text if overlaid on the segment, in some embodiments. In some such embodiments, the readability prediction module 240 predicts there is at least a threshold readability of the text if overlaid on the segment if the computed readability score is at least the threshold readability score. For example, the readability prediction module 240 computes a readability score corresponding to an average normalized difference between computed values describing various visual characteristics of a segment of an image and their corresponding threshold values, and compares the computed readability score to a threshold readability score. If the readability score is less than the threshold readability score, the readability prediction module 240 predicts there is less than the threshold readability of the text if overlaid on the segment, indicating one or more visual characteristics of the segment would likely render the text unreadable to the user if overlaid on the segment when presented. However, if the readability score of the previous example is at least the threshold readability score, the readability prediction module 240 predicts there is at least a threshold readability of the text if overlaid on the segment, indicating the text is likely readable by the user if overlaid on the segment when presented.

In various embodiments, the readability prediction module 240 may train a machine learned model to predict the readability of text if overlaid on a segment of an image. For example, using a set of values describing visual characteristics of segments of images on which text has been overlaid without loss of readability as training data, the readability prediction module 240 trains a machine learned model to output a predicted readability of text if overlaid on a segment of an image using one or more values describing various visual characteristics of the segment computed by the image evaluation module as input features. In some such embodiments, one or more machine learning techniques may be used to train the machine learned model to predict the readability of text if overlaid on a segment of an image based on determined relationships between values computed by the image evaluation module describing various visual characteristics of the segment. For example, the machine learning techniques may include a classification technique, a clustering technique, a decision tree learning technique, a random forest technique, a logistic regression technique, a linear regression technique, and a gradient boosting technique.

In various embodiments, the characteristic selection module 245 selects one or more characteristics of a font for text included in a content item presented by the online system

140. In some embodiments, the one or more characteristics of a font are selected based at least in part on a comparison of a threshold value to a value computed by the image evaluation module 235 describing one or more visual characteristics of a segment of an image on which text may be overlaid. For example, the characteristic selection module 245 selects a characteristic of a font for text included in a content item if the readability prediction module 240 predicts the readability of the text is at least a threshold readability if overlaid on a segment of an image based on a magnitude of brightness of the segment having at least a threshold magnitude of brightness.

The one or more characteristics of a font selected by the characteristic selection module 245 include a magnitude of brightness of the font and/or a color of the font, in various embodiments. In some embodiments, additional characteristics of a font that may be selected by the characteristic selection module 245 include a type of the font, a size of the font, a character spacing of the font, and/or a weight of the font. In one embodiment, the characteristic selection module 245 selects a magnitude of brightness for a font that contrasts with a magnitude of brightness described by a brightness value computed by the image evaluation module 235 (e.g., a value describing a magnitude of brightness of a segment of an image on which text may be overlaid). For example, based on a scale of brightness in which black font has a font brightness value of 0 and white font has a font brightness value of 255, the characteristic selection module 245 selects a font brightness value of 0 for text overlaid on a segment of an image if a computed brightness value describing a magnitude of brightness of the segment is 255. Continuing this example, the characteristic selection module 245 selects a font brightness value of 255 for text overlaid on the segment if the computed brightness value describing the magnitude of brightness of the segment is 0. Hence, the characteristic selection module 245 selects a magnitude of brightness for a font that contrasts with a magnitude of brightness of a segment of an image on which text may be overlaid.

In another embodiment, if the readability prediction module 240 predicts a readability of text overlaid on a segment of an image is at least a threshold readability based on a determination that a color value and/or face value associated with the segment is less than a threshold value (e.g., the segment is monochromatic), the characteristic selection module 245 selects a color and/or magnitude of brightness for a font that contrasts with the visual characteristic(s) described by the color value and/or face value. For example, the characteristic selection module 245 determines a primary color of at least a threshold amount of pixels of a segment of an image and selects a font color and magnitude of brightness for the font having at least a threshold amount of contrast with the primary color.

In various embodiments, the characteristic selection module 245 may also determine whether to apply a gradient to a segment of an image on which text may be overlaid. A gradient applied to a segment of an image modifies an opacity of a set of pixels forming the segment such that one dimension of the segment has an opacity that is either greater than or less than the opacity of an opposite dimension of the segment. For example, applying a gradient to a segment of an image decreases a magnitude of opacity of each row of multiple rows of pixels forming the segment by a specified factor relative to a magnitude of opacity of an adjacent row of pixels, such that the opacity of the portion of the image comprising the segment gradually decreases from an inner dimension of the segment to an outer dimension of the segment. In the preceding example, a first row of pixels forming an inner dimension of the segment has a magnitude of opacity that is decreased by a specified factor relative to a magnitude of opacity of an adjacent row of pixels that borders the segment, a second row of pixels in the segment adjacent to the first row of pixels has a magnitude of opacity that is decreased by the specified factor relative to the magnitude of opacity of the first row of pixels, etc.

Applying a gradient to the segment allows the character selection module 245 to increase or reduce a magnitude of opacity of the segment to allow greater readability of text overlaid on the segment, in some embodiments. For example, the characteristic selection module 245 applies a gradient to a segment of an image if a computed brightness value describing a magnitude of brightness of at least a threshold number of pixels forming the segment is greater than a low threshold brightness value and less than a high threshold brightness value but close to the high threshold brightness value, indicating the segment is moderately bright. In this example, the characteristic selection module 245 applies an opacity gradient to the segment to increase the opacity of the segment to exhibit a magnitude of brightness that is above the high threshold brightness value, allowing greater readability of contrasting dark text overlaid on the segment. Continuing this example, the characteristic selection module 245 also applies an opacity gradient to the segment if the computed brightness value is less than a high threshold brightness value and greater than a low threshold brightness value but close to the low threshold brightness value, indicating the segment is moderately dark. In this example, the characteristic selection module 245 applies the opacity gradient to the segment to decrease the opacity of the segment to exhibit a magnitude of brightness that is below the low threshold brightness value, allowing greater readability of contrasting bright text overlaid on the segment. Additional gradients that may be applied to the segment include a brightness gradient, a contrast gradient, a color gradient, and any other gradient suitable for increasing the readability of text overlaid on the segment, in various embodiments.

The interface generator 250 generates one or more user interfaces presenting information maintained by the online system 140 and allowing online system users to interact with the presented information. Various types of user interfaces may be generated by the interface generator 250. For example, a feed of content presenting a navigable chronological sequence of a user's information from one or more of the user profile store 205, the content store 210, the action log 220 and the edge store 225 is generated by the interface generator 250 and presented to online system users determined by the online system 140 to be eligible to receive the content. In various embodiments, content items selected by the content selection module 230 may be presented to a user in a feed of content generated by the interface generator 250. For example, when a user logs in to the online system 140 or otherwise requests content from the online system 140, the content selection module 230 retrieves content items maintained by the online system 140 (e.g., from the content store 210) and determines an affinity of the user for each of the content items based on attributes associated with the user's account on the online system 140 matching attributes of the content items. In this example, the content selection module 230 selects a set of the retrieved content items for which the user has at least a threshold affinity and the interface generator 250 generates a feed of content including the selected content items, which the online system 140 may provide to a client device 110 associated with the user for presentation to the user.

Content items presented in a feed of content generated by the interface generator 250 may include various types of content, including images, text, videos, audio, etc. In various embodiments, the interface generator 250 generates a user interface including content items including various types of content in various configurations. For example, content items including images and text may be included in a feed of content in a configuration in which the images and text are adjacent to each other in the feed of content when presented to a user. As another example, a content item including an image and text is included in a feed of content in a configuration in which the text is overlaid on a segment of the image to conserve space in the feed of content if the online system 140 predicts overlaying the text on the segment will not render the text unreadable to a user presented with the feed of content. Determining whether to overlay text included in a content item on an image included in the content item for presentation to a user is further described in more detail below in conjunction with FIGS. 3-9.

In various embodiments, the feed of content items generated by the interface generator 250 is a feed of content associated with an online system user's account on the online system, such as a newsfeed. For example, the interface generator 250 generates a newsfeed that is associated with a user's account on the online system 140 and is presented to the user on a profile page associated with the user when the user logs in to the online system 140. Content feeds generated by the interface generator 250 may include information identifying posting users from whom the content items included in the content feeds were received, in various embodiments. Information identifying a posting user from whom a content item was received may include a name of the posting user, an image associated with the posting user's account on the online system 140, or any other suitable information used by the online system 140 to identify the posting user to a viewing user.

In various embodiments, content feeds generated by the interface generator 250 may include a graphical user interface that presents content items to a user via a client device 110 associated with the user and receives interactions of the user with the content feeds. The graphical user interface may include various interactive elements that allow the user to navigate through the content feed to view content items included in the feed and to submit certain requests to the online system 140 related to the content feed. For example, a user may request a content item provided to the online system 140 by a posting user connected to the user on the online system by selecting an image associated with the posting user's account on the online system 140 presented to the user in a display area of the graphical user interface. As an additional example, a user may express a preference for or comment on a content item included in a content feed. In this example, the interface generator 250 may generate a content item describing the action performed by the user and update the content feed to include the content item. The content feed may also allow a user to perform an action associated with a presented content item and to submit content items to the online system 140 for presentation by the online system 140 to additional online system users. For example, the user interacts with various interactive elements of a content feed to indicate a preference for a content item included in the content feed or to upload a content item associated with the user for presentation by the online system 140 to additional online system users.

The web server 255 links the online system 140 via the network 120 to the one or more client devices 110, as well as to the one or more third party systems 130. The web server 255 serves web pages, as well as other content, such as JAVA®, FLASH®, XML and so forth. The web server 255 may receive and route messages between the online system 140 and the client device 110; for example, the messages are instant messages, queued messages (e.g., email), text messages, short message service (SMS) messages, or messages sent using any other suitable messaging technique. A user may send a request to the web server 255 to upload information (e.g., images or videos) that are stored in the content store 210. Additionally, the web server 255 may provide application programming interface (API) functionality to send data directly to native client device operating systems, such as IOS®, ANDROID™, WEBOS® or BlackberryOS.

Figure 3:
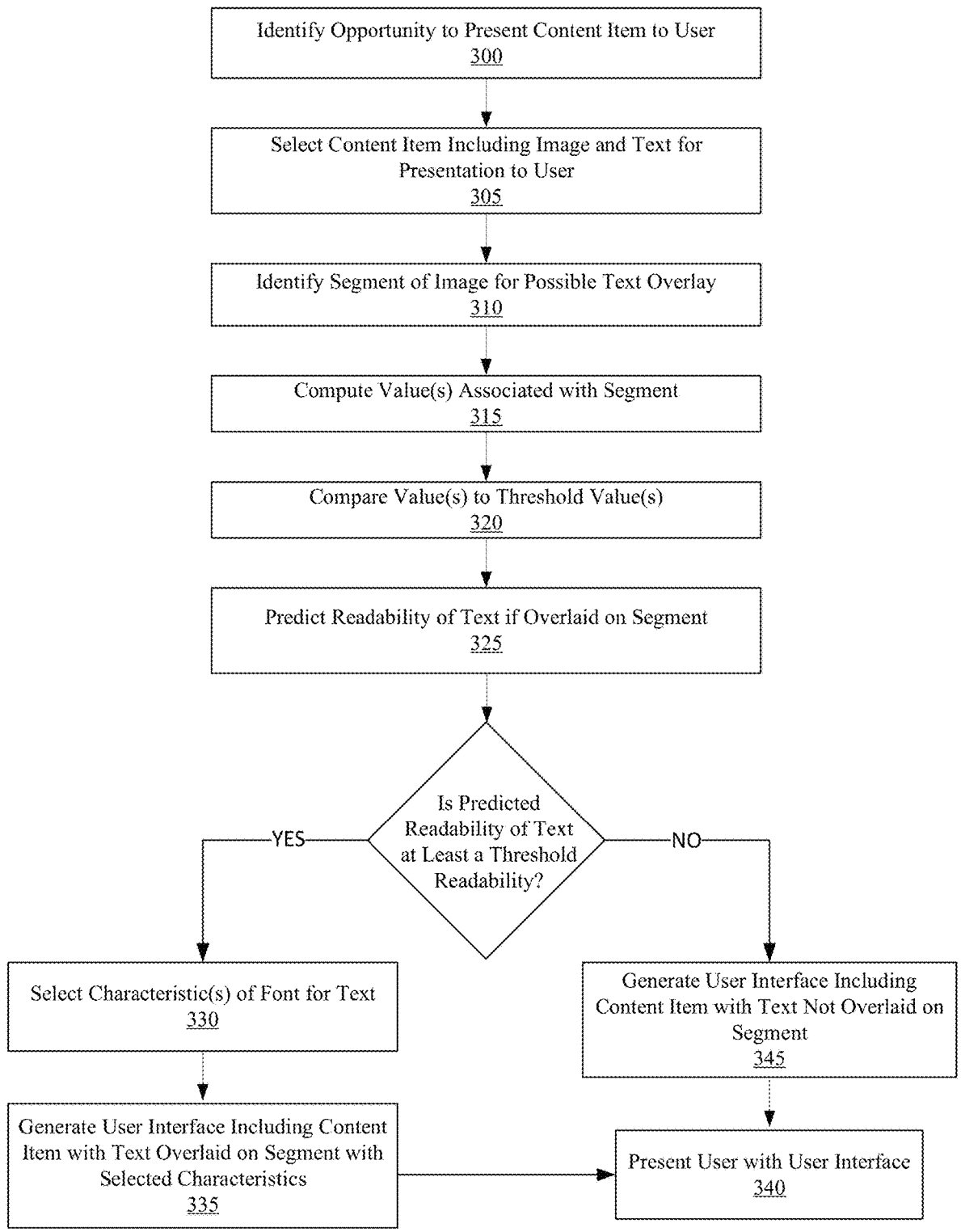
FIG. 3 is a flow chart illustrating a method for determining whether to overlay text included in a content item on an image included in the content item for presentation to an online system user, in accordance with an embodiment.

Determining Whether to Overlay Text Included in a Content Item on an Image Included in the Content Item for Presentation to a User of an Online System FIG. 3 is a flow chart illustrating a method for determining whether to overlay text included in a content item on an image included in the content item for presentation to a user of an online system. In other embodiments, the method may include different and/or additional steps than those shown in FIG. 3. Additionally, steps of the method may be performed in different orders than the order described in conjunction with FIG. 3 in various embodiments.

Referring to FIG. 3, the online system 140 identifies 300 an opportunity to present content to a user of the online system 140 and selects 305 one or more content items for presentation to the user in a feed of content provided to the user. In various embodiments, the online system 140 identifies 300 an opportunity to present content to a user when the user logs into an account on the online system 140 associated with the user. Upon identifying 300 the opportunity to present content to the user, the online system 140 selects 305 content items generated by the online system 140 and/or provided to the online system 140 for presentation to the user. For example, the online system 140 identifies 300 an opportunity to present content to a user upon receiving a request from the user to access a newsfeed associated with the user's account on the online system 140 and selects 305 content items generated by the online system 140 for presentation to the user based on a predicted affinity of the user for each of the selected content items. Selection of content items eligible for presentation to the user based on a predicted affinity of the user for the content items is described in more detail above in conjunction with FIG. 2.

In various embodiments, content items selected 305 by the online system 140 for presentation to the user are sponsored content items for which the online system 140 receives compensation in exchange for presenting to a user, while in other embodiments, the content items are organic content items for which the online system 140 does not receive compensation in exchange for presenting to the user. In some embodiments, the online system 140 selects 305 both sponsored content items and organic content items for presentation to the user in a feed of content associated with the user's account on the online system 140. For example, the feed of content is a newsfeed associated with the user's account on the online system 140 comprising a user interface including the selected content items and is communicated to a client device 110 associated with the user for presentation to the user via a display area of the client device 110.

In various embodiments, at least one of the one or more content items selected 305 by the online system 140 for presentation to the user in the feed of content includes an image and text associated with the image. Either one or both of the image and text may be generated by the online system 140 or provided to the online system 140 by an online system user for presentation by the online system 140. For example, the image is a photograph or other type of graphic information uploaded to the online system 140 by an online system user or generated by the online system 140 and maintained by the online system 140 for presentation to online system users meeting certain targeting criteria. Text associated with the image may include a description of a subject of the image, an offer associated with a product or service depicted by the image, a caption for the image, etc. Hence, the online system 140 selects 305 a sponsored or organic content item comprising an image and text associated with the image for presentation to the user in a feed of content.

Figure 4:
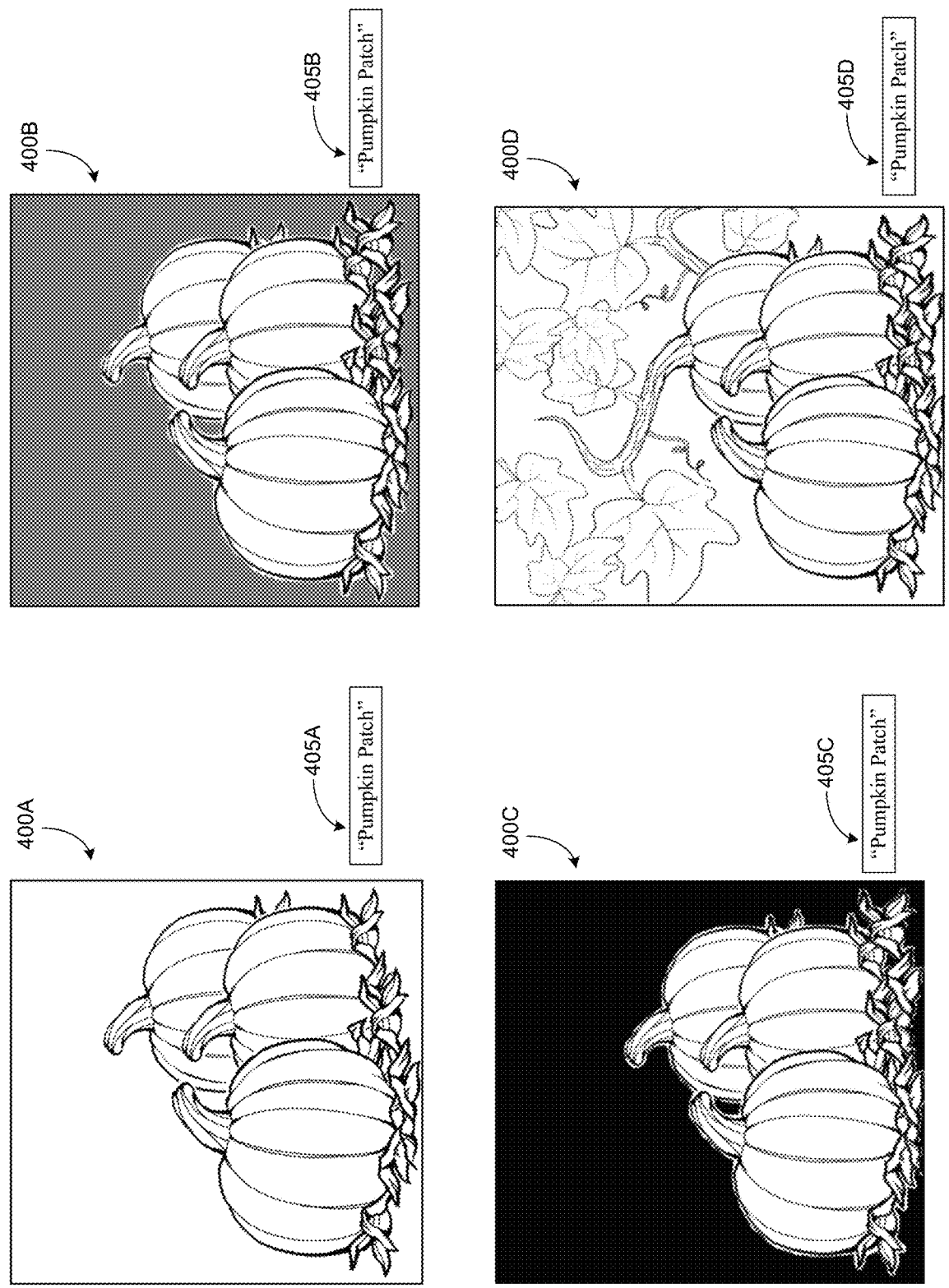
FIG. 4 illustrates example images and text associated with the images selected by the online system for presentation to an online system user, in accordance with an embodiment.
Figure 5:
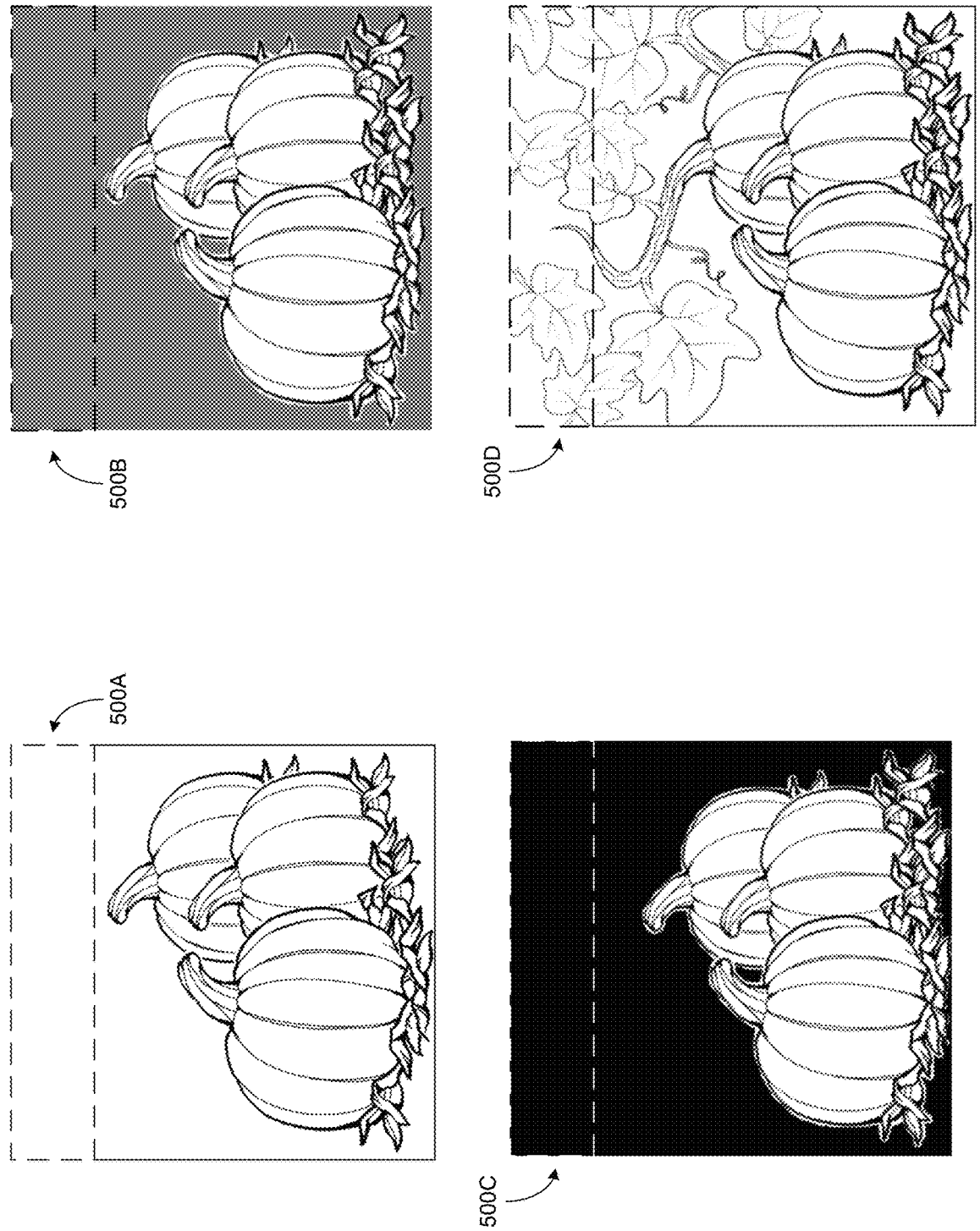
FIG. 5 illustrates example segments of images identified by the online system on which text associated with the images may be overlaid for presentation to an online system user, in accordance with an embodiment.

As an example, referring to FIG. 4, the online system 140 identifies 300 an opportunity to present content to a user who meets certain targeting criteria indicating the user may be interested in receiving content describing a pumpkin patch which is located within a threshold distance from the user when the user logs in to the online system 140. In this example, the online system 140 selects 305 a content item for presentation to the user in a newsfeed associated with the user's account on the online system 140. As shown in this example, the selected content item includes an image 400 of the pumpkin patch and text 405 associated with the image 400 which provides a caption for the image 400. The image 400 of the pumpkin patch and text 405 associated with the image 400 in this example may be received from a posting user of the online system 140 associated with the pumpkin patch along with targeting criteria requesting the online system 140 to present a content item including the image 400 and text 405 to online system users within the threshold distance from the pumpkin patch. As shown in this example, the image 400 may have various visual characteristics, such a high magnitude of brightness or low magnitude of darkness (as shown in image 400A), a low magnitude of brightness or high magnitude of darkness (as shown in image 400C), a magnitude of brightness or darkness that is neither high nor low (as shown in image 400B), a variable distribution of color and/or graphic detail (as shown in image 400D), etc.

The online system 140 identifies 310 a segment of the image 400 included in the selected content item on which the text 405 associated with the image may be overlaid. In various embodiments, the online system 140 identifies 310 a segment of the image 400 on which the text 405 may be overlaid by identifying 310 a region of pixels forming a portion of the image 400 large enough to accommodate the text 405 in a font having at least a minimum character size to be readable by a user presented with the content item. For example, referring to FIG. 5, the online system 140 identifies 310 a segment 500 of the image 400 including multiple columns and/or rows of pixels along a dimension of the image 400 to accommodate one or more rows of text in a font having a character size of at least 10 points as presented in a display area of a client device 110 associated with the user.

Various visual characteristics of the segment 500 are identified by the online system 140 and analyzed to determine whether the characteristics will potentially render the text 405 unreadable if the text 405 is overlaid on the segment 500 for presentation to the user. For example, the online system 140 predicts 325 text 405 overlaid on a segment 500 of an image 400 will be unreadable to a user if the segment 500 has a magnitude of brightness that is above or below certain threshold magnitudes of brightness or has above a threshold amount of colors or graphic detail. In the previous example, a segment 500 having a magnitude of brightness that is above or below the threshold magnitudes of brightness is determined to have a brightness that is neither dark enough nor bright enough to allow text 405 in a font of contrasting brightness to be easily read if overlaid on the segment 500, while a segment 500 having above the threshold amount of colors is determined to be too colorful and therefore too visually distracting to allow text 405 to be easily read if overlaid on the segment 500. As an additional example, the online system 140 predicts 325 text 405 overlaid on a segment 500 of an image 400 including at least a threshold portion of a face will be unreadable to a user presented with the content item because the segment 500 will be too visually distracting to allow text 405 to be easily read if overlaid onto the portion of the face included in the segment 500.

To predict 325 whether various visual characteristics of the segment 500 will potentially render the text 405 unreadable if the text 405 is overlaid on the segment 500, the online system 140 computes 315 one or more values describing each of the various visual characteristics of the segment 500 identified 310 by the online system 140 and compares 320 the computed values to one or more corresponding threshold values. In various embodiments, at least one of the one or more computed values includes a brightness value, which is a measure of a magnitude of brightness of a specified amount of pixels forming the segment 500 of the image 400 on which the text 405 may be overlaid. For example, the online system 140 identifies a distribution of magnitudes of brightness among pixels forming the segment 500 of the image 400 and computes 315 a brightness value describing an average magnitude of brightness shared by at least a threshold number or percentage of the pixels.

In some embodiments, the online system 140 computes 315 the brightness value by generating a histogram describing the distribution of brightness from pure black to pure white among pixels of the segment 500, assigning a pixel value to each magnitude of brightness described by the histogram, and computing 315 a mean of the assigned values among a threshold portion of the pixels. For example, referring to FIG. 6, the online system assigns a pixel value of between 0 and 255 to each pixel comprising the segment 500 of the image 400 based on a magnitude of brightness of the pixel. Pixels having a magnitude of brightness that is pure black are assigned a pixel value of 0, pixels having a magnitude of brightness that is pure white are assigned a pixel value of 255, and pixels having a magnitude brightness that is greater than pure black and less than pure white are assigned a pixel value in a range of 0-255 that is proportional to the magnitude of brightness of the pixel.

Figure 6:
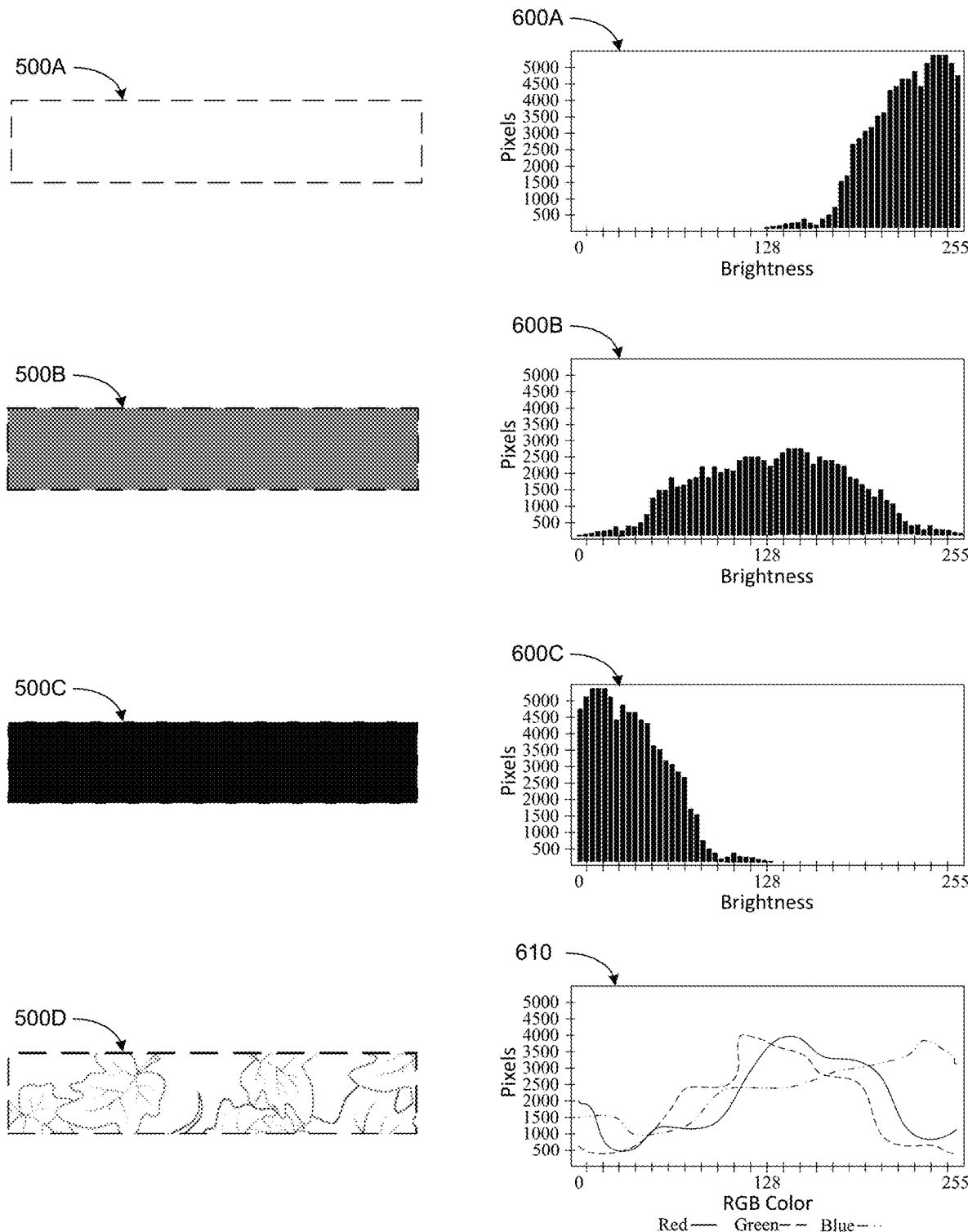
FIG. 6 illustrates example histograms generated by the online system describing various visual characteristics of segments of images on which text may be overlaid, in accordance with an embodiment.

As illustrated in FIG. 6, the online system 140 generates a brightness histogram 600 describing a distribution of brightness from pure black to pure white among pixels of the segment 500 and assigns a pixel value to each magnitude of brightness described by the histogram 600. For example, referring to histogram 600A, pixel values between 128 and 255 are assigned to pixels of segment 500A, which has a predominantly high magnitude of brightness. Conversely, referring to histogram 600C, pixel values between 0 and 130 are assigned to pixels of segment 500C, which has a predominantly low magnitude of brightness. The online system 140 determines a number of pixels assigned each pixel value. For example, referring again to histogram 600A, the online system 140 determines there are 10 pixels assigned the lowest pixel value of 128, 4,540 pixels assigned the highest pixel value of 255, and various numbers of pixels assigned pixel values between 128 and 255. To compute 315 the brightness value for the segment 500, the online system 140 computes 315 a mean of the assigned pixel values of a threshold portion of the pixels comprising the segment 500; the mean is the brightness value, in this example. In various embodiments, the threshold portion of pixels on which the brightness value is based is a number or percentage of pixels determined by the online system 140 to be a minimum representative amount of pixels from which an overall magnitude of brightness of the segment 500 may be determined. Thus, if the threshold portion of pixels is 70%, the online system 140 computes 315 the brightness value by computing 315 a mean of the assigned pixel values among 70% of the pixels comprising the segment 500.

In some embodiments, at least one of the one or more values computed 315 by the online system 140 to describe a visual characteristic of the segment 500 includes a color value, which is a measure of colorfulness of a specified amount of pixels forming the segment 500. For example, the online system 140 identifies a distribution of colors among pixels forming the segment 500 and computes 315 a color value describing the distribution of colors among at least a threshold number or percentage of the pixels. The color value may correspond to a number of colors included in at least a threshold portion of pixels comprising the segment 500, a ratio of the number of colors to a number of pixels comprising at least the threshold portion of the segment 500, or any other suitable measure of colorfulness of the segment 500, in some embodiments. Returning to the example of FIG. 6, the online system 140 generates a color histogram 610 describing a distribution of colors in the segment 500D and assigns an RGB color value to each pixel of the segment 500D. The online system 140 determines a number of pixels assigned each RGB color value and computes 315 a ratio of the number of assigned RGB color values to a number of pixels comprising at least a threshold portion of the segment 500D. In various embodiments, the threshold portion of pixels on which the color value is based is a number or percentage of pixels determined by the online system 140 to be an appropriate representative amount of pixels from which a measure of an overall distribution of color of the segment 500 may be determined. Thus, if the threshold portion of pixels is 60%, the online system 140 computes 315 the color value by computing 315 a ratio of the number of assigned RGB color values to a number of pixels comprising at least 60% of the pixels.

In some such embodiments, the online system 140 may quantize colors of the segment 500 to generate a quantized set of colors on which the color value is based. For example, if the online system 140 detects there are 256 colors included in an image 400 on which text 405 may be overlaid, the online system 140 utilizes a color quantization algorithm to reduce the number of colors to a set of 64 colors and computes 315 a color value describing a distribution of the 64 colors among the pixels forming the segment 500. Additionally, or alternatively, the online system 140 may compute 315 a color value describing a colorfulness of the segment 500 based on differences of color ("color shifts") among sequentially adjacent pixels forming the segment 500, in some embodiments. For example, rather than quantizing the colors of the segment 500, the online system 140 detects threshold differences of color between adjacent pixels in each column and/or row of pixels forming the segment 500 and computes 315 a color value describing the number of detected differences.

In yet other embodiments, at least one value of the one or more values computed 315 by the online system 140 to describe a visual characteristic of the segment 500 describes a portion of the segment 500 representing at least a threshold portion of a face or other graphic detail. For example, using a face detection algorithm, the online system 140 detects the image includes a human face and computes 315 a value describing a number or percentage of pixels of the segment comprising an area of the face including at least a portion of an eye, a nose and a mouth.

The online system 140 compares 320 the one or more computed values associated with the segment 500 to one or more corresponding threshold values and predicts 325 a readability of the text 405 if overlaid on the segment 500 when presented to the user based on the comparison. The predicted readability of the text 405 describes a predicted likelihood the text 405 would be readable by a user if the text 405 is overlaid on the segment 500 when presented. In various embodiments, the online system 140 predicts 325 there is at least a threshold readability of the text 405 if overlaid on the segment if one or more of the computed values are at least a corresponding threshold value. For example, if a brightness value describing a magnitude of brightness of at least a threshold portion of the segment 500 is above a threshold magnitude of brightness (e.g., the segment is very bright), the online system 140 predicts 325 the text 405 may be overlaid on the segment 500 without loss of readability (e.g., in a dark font). In such embodiments, a value that is below the threshold value indicates a characteristic of the segment 500 described by the value would cause the text 405 to be unreadable by a user presented with the content item if the text 405 is overlaid on the segment 500.

As an example, the online system 140 computes 315 a brightness value of 255 indicating an average magnitude of brightness among at least 95% of the pixels forming the segment 500 is pure white and compares 320 the brightness value to a threshold brightness value of 245. In this example, the threshold brightness value of 245 describes a minimum magnitude of brightness on which text 405 may be overlaid without loss of readability, as determined by the online system 140; overlaying text 405 on a segment 500 having a lower magnitude of brightness renders the text 405 unreadable (e.g., text 405 in a black font appears faded out on a dark gray background). Since the brightness value of 255 in this example is at least the threshold value of 245, the online system 140 predicts 325 the readability of the text 405 if overlaid on the segment 500 is at least the threshold readability. Since the segment 500 of the previous example comprises at least a threshold amount of pixels exhibiting a magnitude of brightness that is above the threshold level of brightness (e.g., the segment 500 is very bright), the online system 140 predicts 325 text 405 may be overlaid on the segment 500 without loss of readability in a dark font.

In some embodiments, the online system 140 also predicts 325 there is at least a threshold readability of the text 405 if overlaid on the segment 500 if one or more of the computed values are below a threshold value. For example, if a brightness value describing a magnitude of brightness of at least a threshold portion of the segment 500 is below a threshold magnitude of brightness (e.g., the segment 500 is very dark), the online system 140 predicts 325 text 405 may be overlaid on the segment 500 without loss of readability in a bright font. As another example, if a color value describing a distribution of colors among at least a threshold portion of the segment 500 is below a threshold color value (e.g., the segment 500 is monochromatic), the online system 140 predicts 325 text 405 may be overlaid on the segment 500 without loss of readability in a contrasting font.

In such embodiments, a value describing a visual characteristic of the segment 500 that is at least a threshold value indicates the visual characteristic would cause text 405 to be unreadable by a user if overlaid on the segment 500 when presented. For example, the online system 140 computes 315 a brightness value of 0 indicating an average magnitude of brightness among at least 90% of pixels forming the segment 500 is pure black and compares 320 the brightness value to a threshold brightness value of 30. In this example, the threshold brightness value of 30 describes a maximum magnitude of brightness on which the online system 140 has determined text 405 may be overlaid without loss of readability; overlaying text 405 on a segment 500 having a higher magnitude of brightness renders the text 405 unreadable (e.g., text 405 in a white font appears washed out on a light gray background). Since the brightness value of 0 in the preceding example is less than the threshold value of 30, the online system 140 predicts 325 the readability of the text 405 if overlaid on the segment 500 is at least the threshold readability. Since the segment 500 of the previous example is comprised of at least a threshold amount of pixels exhibiting a magnitude of brightness that is below the threshold level of brightness (e.g., the segment 500 is black), the online system 140 predicts 325 text 405 may be overlaid on the segment 500 without loss of readability (e.g., in a white font).

As yet another example, the online system 140 computes 315 a color value of 15 indicating there are 15 threshold differences of color between adjacent pixels forming at least 80% of the segment 500 and compares 320 the color value to a threshold color value of 10. In this example, the online system 140 predicts 325 the readability of the text 405 if overlaid on the segment 500 is less than the threshold readability since the color value of 15 is greater than the threshold value of 10. Since the color value of the segment 500 of the previous example is at least the threshold color value, the online system 140 predicts 325 the segment 500 is too colorful and therefore too visually distracting to allow text 405 to be read if overlaid on the segment 500. In embodiments in which a value describing a portion of a face or other graphic detail included in the segment 500 is computed 315, a similar comparison to a corresponding threshold value and prediction of the text's 405 readability if overlaid on the segment 500 based on the comparison is made.

In embodiments in which more than one value describing a visual characteristic of the segment 500 is computed 315 and compared 320 to a corresponding threshold value, the predicted readability of the text 405 if overlaid on the segment 500 may be expressed as a readability score that is based on each comparison. The readability score is then compared to a threshold readability score to predict 325 whether there is at least a threshold readability of the text 405 if overlaid on the segment 500. In such embodiments, the online system 140 predicts 325 there is at least a threshold readability of the text 405 if overlaid on the segment 500 if the computed readability score is at least the threshold readability score. For example, the online system 140 computes 315 a readability score corresponding to an average normalized difference between the computed values describing the various visual characteristics of the segment 500 and corresponding threshold values, and compares 320 the computed readability score to a threshold readability score. If the readability score is less than the threshold readability score, the online system 140 predicts 325 there is less than the threshold readability of the text 405 if overlaid on the segment 500, indicating one or more visual characteristics of the segment 500 would likely render the text 405 unreadable to the user if overlaid on the segment 500 when presented. However, if the readability score is at least the threshold readability score, the online system 140 predicts 325 there is at least a threshold readability of the text 405 if overlaid on the segment 500, indicating the text 405 is likely readable by the user if overlaid on the segment 500 when presented.

In various embodiments, the predicted readability of the text 405 if overlaid on the segment 500 may be determined using a machine learned model. For example, using a set of values describing visual characteristics of images on which text has been overlaid without loss of readability as training data, the online system 140 trains a machine learned model to output a predicted readability of the text 405 if overlaid on the segment 500 using one or more of the computed values describing the various visual characteristics of the segment 500 as input features. In such embodiments, one or more machine learning techniques may be used to train the machine learned model to predict 325 the readability of the text 405 if overlaid on the segment 500 based on a determined relationship between the computed values describing the various visual characteristics of the segment 500. For example, the machine learning techniques may include a classification technique, a clustering technique, a decision tree learning technique, a random forest technique, a logistic regression technique, a linear regression technique, and a gradient boosting technique.

If the online system predicts 325 the readability of the text 405 if overlaid on the segment 500 is at least a threshold readability, the online system 140 selects 330 one or more characteristics of a font for the text 405 based at least in part on the comparison of the one or more computed values to the one or more corresponding threshold values. In various embodiments, the one or more characteristics of the font selected 330 by the online system 140 for the text 405 include a magnitude of brightness of the font and/or a color of the font. Additional characteristics of the font that may be selected 330 by the online system 140 for the text 405 include a type of the font, a size of the font, a character spacing of the font, and/or a weight of the font, in some embodiments.

In one embodiment, if the online system 140 computes 315 a brightness value for the segment 500 and the brightness value is at least a threshold brightness value (e.g., the segment 500 is very bright) or below a threshold brightness value (e.g., the segment 500 is very dark), the online system 140 selects 330 a magnitude of brightness for the font that contrasts with the magnitude of brightness described by the brightness value. For example, based on a scale of brightness in which pure black font has a font brightness value of 0 and pure white font has a font brightness value of 255, if the brightness value describing the magnitude of brightness of the segment 500 is 255, the online system 140 selects 330 a magnitude of brightness for the font having a font brightness value of 0. However, if the brightness value describing the magnitude of brightness of the segment 500 in the previous example is 0, the online system 140 selects 330 a magnitude of brightness for the font having a font brightness value of 255.

In another embodiment, if the online system 140 computes 315 a color value and/or face value for the segment 500 and the color value and/or face value is less than a threshold value (e.g., the segment 500 is monochromatic), the online system 140 selects 330 a color and/or magnitude of brightness for the font determined to contrast with the visual characteristic(s) described by the color value and/or face value. For example, the online system 140 determines a primary color of at least a threshold amount of pixels of the segment 500 based on a color value computed 315 for the segment 500 and selects 330 a font color and magnitude of brightness for the font having at least a threshold amount of contrast with the primary color.

Figure 7:
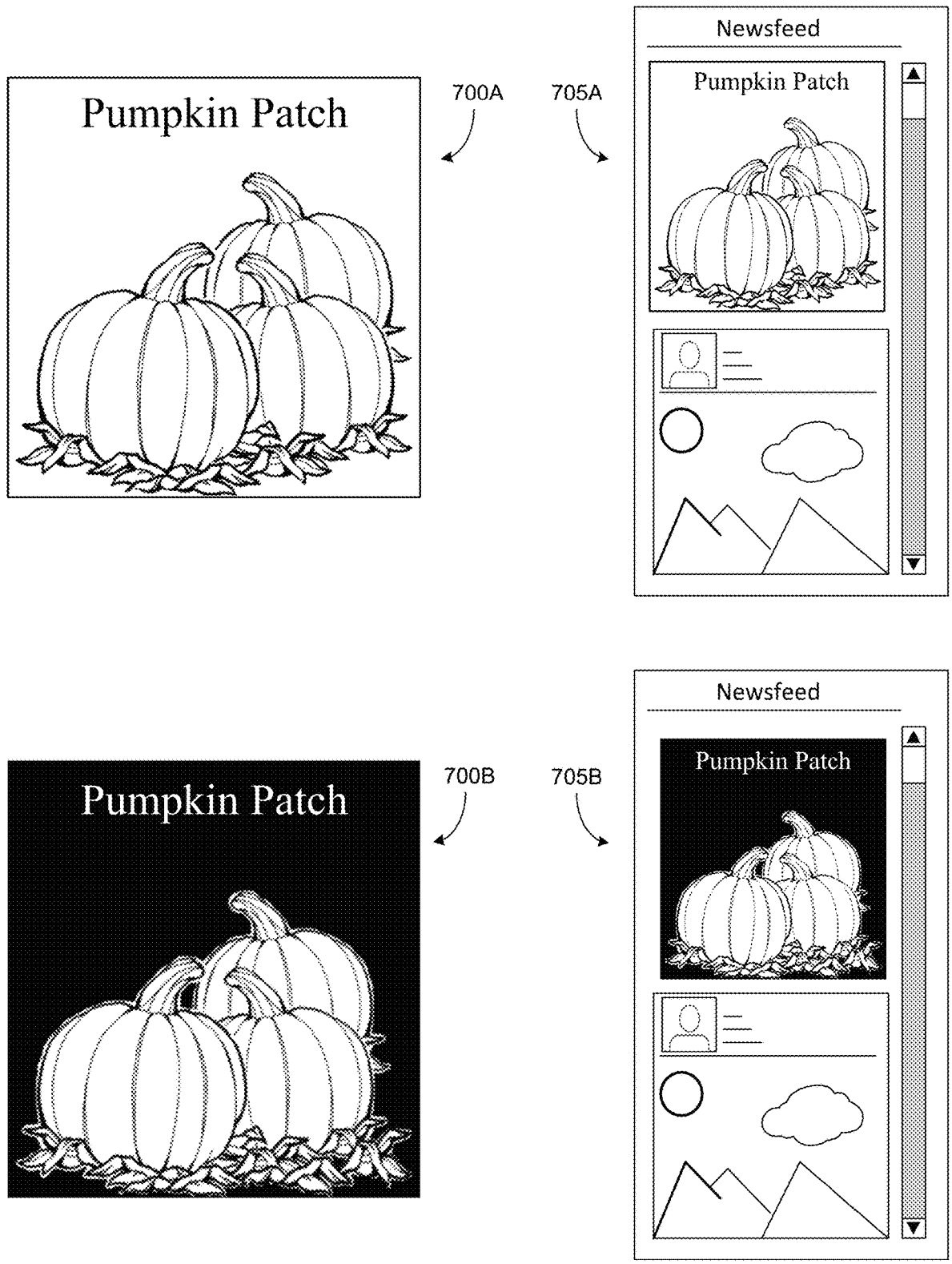
FIG. 7 illustrates example content items including text overlaid on an image, and user interfaces including the content items for presentation to an online system user, in accordance with an embodiment.

The online system 140 overlays the text 405 on the segment 500 in a font having the one or more selected 330 characteristics and generates 335 a user interface including the content item with the overlaid text 405 for presentation to the user. For example, as illustrated in FIG. 7, if the online system 140 predicts 325 the readability of the text 405 if overlaid on the segment 500 is at least the threshold readability based on a brightness value computed 315 for the segment 500 that meets or exceeds a threshold brightness value, the online system 140 determines the segment 500 has a very high magnitude of brightness and selects 330 a dark font for the text 405. The online system 140 overlays the text 405 on the segment 500 in the dark font and includes the content item 700A with the overlaid text 405 in a user interface 705A for presentation to the user. As another example, if the online system 140 predicts 325 the readability of the text 405 if overlaid on the segment 500 is at least the threshold readability based on a brightness value that is less than a threshold brightness value, the online system 140 determines the segment 500 has a very low magnitude of brightness and selects 330a bright font for the text 405. The online system 140 overlays the text 405 on the segment 500 in the bright font and includes the content item 700B with the overlaid text 405 in a user interface 705B for presentation to the user.

In various embodiments, the online system 140 may also apply a gradient to the segment 500 to improve readability of text 405 overlaid on the segment 500. In some such embodiments, a gradient applied to the segment 500 modifies an opacity of a set of pixels forming the segment 500 such that one dimension of the segment 500 has an opacity that is either greater than or less than the opacity of an opposite dimension of the segment 500. For example, applying the gradient to the segment 500 decreases a magnitude of opacity of each row of multiple rows of pixels forming the segment 500 by a specified factor relative to a magnitude of opacity of an adjacent row of pixels, such that the opacity of the portion of the image 400 comprising the segment 500 gradually decreases from an inner dimension of the segment 500 to an outer dimension of the segment 500. In the preceding example, a first row of pixels forming an inner dimension of the segment 500 has a magnitude of opacity that is decreased by a specified factor relative to a magnitude of opacity of an adjacent row of pixels that borders the segment 500, a second row of pixels in the segment 500 adjacent to the first row of pixels has a magnitude of opacity that is decreased by the specified factor relative to the magnitude of opacity of the first row of pixels, etc.

In one embodiment, the online system 140 applies an opacity gradient to the segment 500 if a computed brightness value describing a magnitude of brightness of at least a threshold number of pixels forming the segment 500 indicates the segment 500 is moderately bright (e.g., the segment 500 has a magnitude of brightness that is less than but almost a threshold magnitude of brightness). This allows the online system 140 to increase the opacity of the segment 500 and therefore the magnitude of brightness of the segment 500, resulting in improved readability of text 405 overlaid on the segment 500 in a dark font. In another embodiment, the online system 140 applies an opacity gradient to the segment 500 if a computed brightness value describing a magnitude of brightness of at least a threshold number of pixels forming the segment 500 indicates the segment 500 is moderately dark (e.g., the segment 500 has a magnitude of brightness that is almost below a threshold magnitude of brightness). This allows the online system 140 to decrease the opacity of the segment 500 and therefore the magnitude of brightness of the segment 500, resulting in improved readability of text 405 overlaid on the segment 500 in a bright font.

Figure 8:
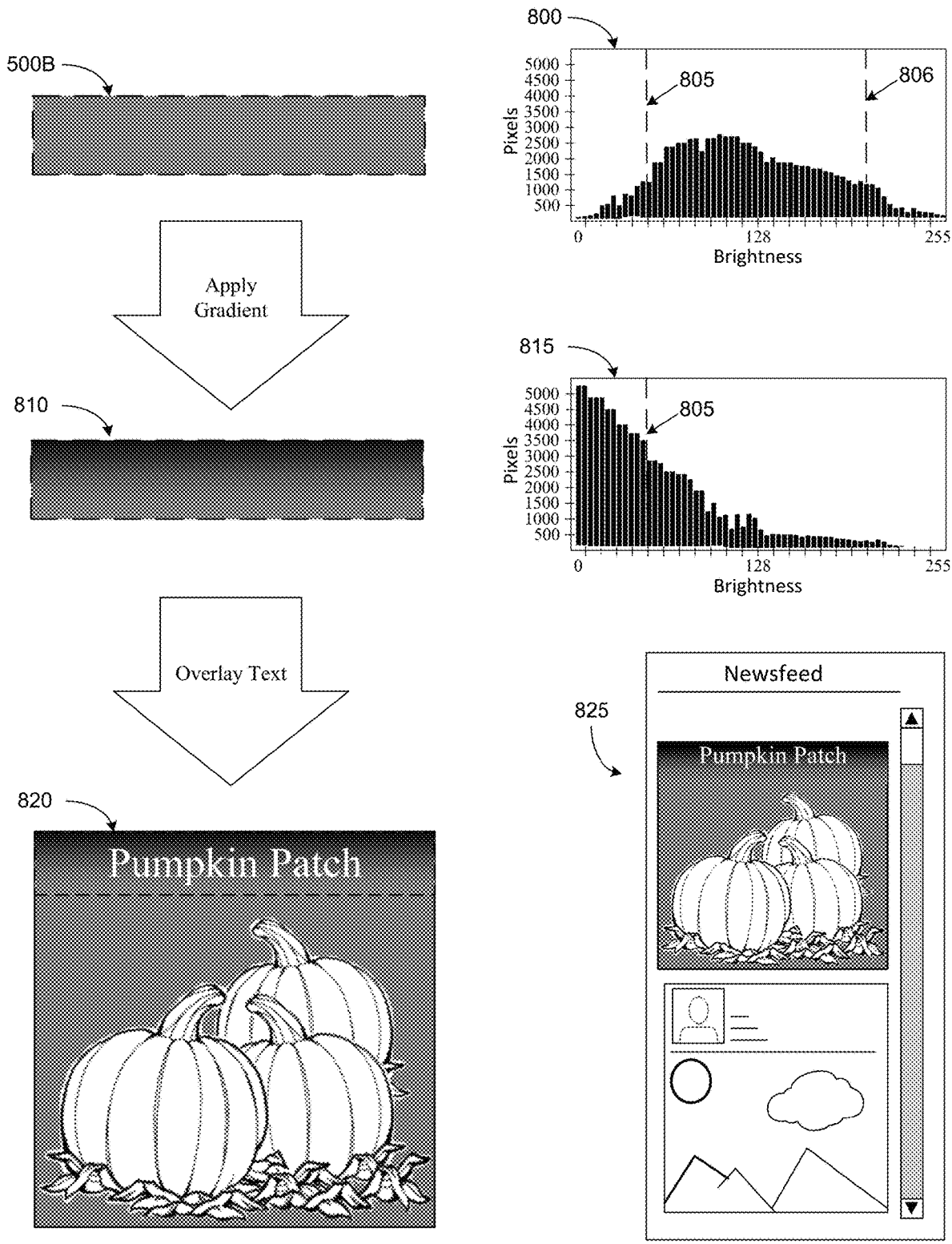
FIG. 8 illustrates an example application of a gradient to a segment of an image on which text is overlaid for presentation to an online system user, in accordance with an embodiment.

For example, as illustrated in FIG. 8, the online system 140 determines at least a threshold amount of pixels comprising the segment 500B have a magnitude of brightness 800 that is greater than but close to a low threshold brightness 805 but less than a high threshold brightness 806, indicating the segment 500B is moderately dark. The online system 140 applies an opacity gradient to the segment 500B to increase the opacity and therefore the darkness of the segment 500B to allow greater readability of text 405 overlaid on the segment 810 in a bright contrasting font. As shown in this example, application of the opacity gradient to the segment 810 decreases the magnitude of brightness 815 of at least the threshold amount of pixels of the segment 810 to a magnitude of brightness 815 that is below the low threshold brightness 805, improving readability of text 405 overlaid on the segment 810 in a bright font. The online system 140 overlays the text 405 on the segment 820 in a font having the one or more selected characteristics and includes the content item 700 with the overlaid text 405 in a user interface 825 for presentation to the user. Additional gradients that may be applied to the segment 500 include a brightness gradient, a contrast gradient, a color gradient, and any other gradient suitable for increasing the readability of text 405 overlaid on the segment 500, in some embodiments.

In various embodiments, the online system 140 presents 340 the user with the user interface 705, 825 including the content item 700 with the text 405 overlaid on the segment 500 of the image 400. For example, the user interface 705, 825 is a feed of content presenting multiple content items to the user via a display area of a client device 110 associated with the user. In one embodiment, the user interface 705, 825 is a feed of content associated with the user's account on the online system 140 (e.g., a newsfeed) including the content item 700 and multiple additional content items selected for presentation to the user based on a predicted affinity of the user for each of the content items. The feed of content is communicated to a client device 110 associated with the user for presentation to the user in a display area of the client device 110.

Figure 9:
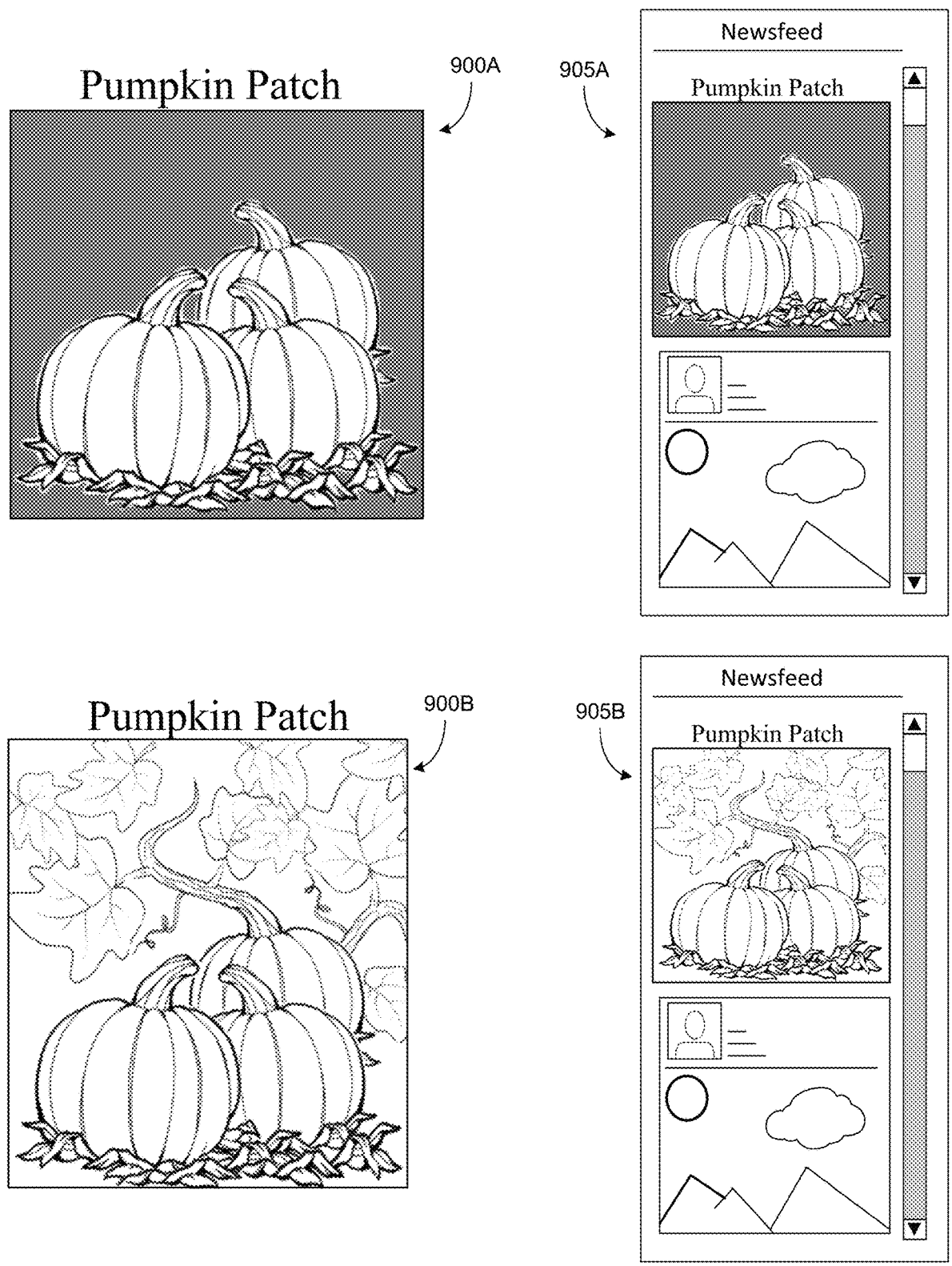
FIG. 9 illustrates example content items including text not overlaid on an image, and user interfaces including the content items for presentation to an online system user, in accordance with an embodiment.

If, however, the online system 140 predicts 325 the readability of the text 405 if overlaid on the segment 500 of the image 400 is not at least the threshold readability, the online system 140 does not overlay the text 405 on the segment 500. For example, as illustrated in FIG. 9, if the online system 140 computes 315 a readability score that is less than a threshold readability score, the online system 140 determines one or more visual characteristics of the segment 500 render the text 405 unreadable if overlaid on the segment 500. In this example, the online system 140 generates 345 a user interface 905 including the content item 900 in a configuration in which the text 405 is adjacent to, but not overlaying, the image 400 for presentation to the user. The online system 140 presents 340 the user with the user interface 905 including the content item 900 in a configuration in which the text 405 is not overlaid on the segment 500. Hence, the online system 140 determines whether to overlay text 405 included in a content item 700, 900 on an image 400 included in the content item 700, 900 for presentation to a user based on various visual characteristics of the image 400 and presents the user with a feed of content including the content item 700, 900 in a configuration that optimizes readability of the text 405.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a nontransitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a nontransitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
identifying an opportunity to present content to a user of an online system;
selecting a content item for presentation to the user, the content item comprising an image and text associated with the image;
identifying a segment of the image on which the text may be overlaid, the segment comprising a plurality of pixels forming a portion of the image;
computing a brightness value describing a magnitude of brightness of at least a threshold number of pixels of the plurality of pixels comprising the segment;
determining that the brightness value associated with the segment is greater than a lower threshold value and less than a high threshold value;
determining that a readability of the text if overlaid on the segment is below a threshold readability;
responsive to determining that the readability of the text is below the threshold readability:
applying an opacity gradient to the segment, the opacity gradient modifying an opacity of a set of pixels of the plurality of pixels comprising the segment,
selecting one or more characteristics of a font for the text based at least in part on the brightness value,
generating a user interface comprising the content item, wherein the text associated with the image is overlaid on the segment in the font having the one or more characteristics, and
presenting the user interface to the user.

2. The method of claim 1, further comprising:
computing a color value that describes a distribution of color among an additional threshold number of pixels of the plurality of pixels comprising the segment.

3. The method of claim 2, wherein computing the color value comprises:
detecting a plurality of colors comprising the segment;
quantizing the plurality of colors to generate a quantized set of colors; and
computing the color value based at least in part on the quantized set of colors.

4. The method of claim 2, wherein computing the color value comprises:
detecting one or more colors comprising a set of adjacent pixels of the plurality of pixels comprising the segment; and
computing the color value based at least in part on a number of the one or more colors comprising the set of adjacent pixels.

5. The method of claim 1, wherein a characteristic of the one or more characteristics of the font for the text is a magnitude of brightness of the font.

6. The method of claim 1, wherein a characteristic of the one or more characteristics of the font for the text is a color of the font.

7. The method of claim 1, further comprising:
determining opacity values of the opacity gradient based on the brightness value.

8. The method of claim 7, wherein the opacity values of the opacity gradient are a function of the brightness value in which the opacity values increase with an increasing brightness value and decrease with a decreasing brightness value.

9. A computer program product comprising a non-transitory computer readable storage medium having instructions encoded thereon that, when executed by a processor, cause the processor to:
- identify an opportunity to present content to a user of an online system;
- select a content item for presentation to the user, the content item comprising an image and text associated with the image;
- identify a segment of the image on which the text may be overlaid, the segment comprising a plurality of pixels forming a portion of the image;
- compute a brightness value describing a magnitude of brightness of at least a threshold number of pixels of the plurality of pixels comprising the segment;
- determine that the brightness value associated with the segment is greater than a lower threshold value and less than a high threshold value;
- determine that a readability of the text if overlaid on the segment is below a threshold readability;
- responsive to determining that the readability of the text is below the threshold readability:
  - apply an opacity gradient to the segment, the opacity gradient modifying an opacity of a set of pixels of the plurality of pixels comprising the segment,
  - select one or more characteristics of a font for the text based at least in part on the brightness value,
  - generate a user interface comprising the content item, wherein the text associated with the image is overlaid on the segment in the font having the one or more characteristics, and
  - present the user interface to the user.

10. The computer program product of claim 9, wherein the computer readable storage medium further has instructions encoded thereon that, when executed by a processor, cause the processor to:
- compute a color value that describes a distribution of color among an additional threshold number of pixels of the plurality of pixels comprising the segment.

11. The computer program product of claim 10, wherein the instructions that cause the processor to compute the color value comprise instructions that cause the processor to:
- detect a plurality of colors comprising the segment;
- quantize the plurality of colors to generate a quantized set of colors; and
- compute the color value based at least in part on the quantized set of colors.

12. The computer program product of claim 10, wherein the instructions that cause the processor to compute the color value comprise instructions that cause the processor to:
- detect one or more colors comprising a set of adjacent pixels of the plurality of pixels comprising the segment; and
- compute the color value based at least in part on a number of the one or more colors comprising the set of adjacent pixels.

13. The computer program product of claim 9, wherein a characteristic of the one or more characteristics of the font for the text is a magnitude of brightness of the font.

14. The computer program product of claim 9, wherein a characteristic of the one or more characteristics of the font for the text is a color of the font.

15. The computer program product of claim 9, wherein the computer readable storage medium further has instructions encoded thereon that, when executed by a processor, cause the processor to:
- determine opacity values of the opacity gradient based on the brightness value.

16. The computer program product of claim 15, wherein the opacity values of the opacity gradient are a function of the brightness value in which the opacity values increase with an increasing brightness value and decrease with a decreasing brightness value.

* * * * *